US012757049B2

(12) United States Patent
Jung et al.

(10) Patent No.: US 12,757,049 B2
(45) Date of Patent: Oct. 6, 2026

(54) METHOD AND APPARATUS FOR CONFIGURING AND REPORTING QoE IN WIRELESS COMMUNICATION SYSTEM

(71) Applicant: Samsung Electronics Co., Ltd., Suwon-si (KR)

(72) Inventors: Sangyeob Jung, Suwon-si (KR); Seungbeom Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/400,379

(22) Filed: Dec. 29, 2023

(65) Prior Publication Data

US 2024/0224100 A1 Jul. 4, 2024

(30) Foreign Application Priority Data

Jan. 2, 2023 (KR) ........................ 10-2023-0000279

(51) Int. Cl.
*H04L 12/26* (2006.01)
*H04W 24/10* (2009.01)

(52) U.S. Cl.
CPC .................................... *H04W 24/10* (2013.01)

(58) Field of Classification Search
CPC ..... H04W 24/10; H04W 24/04; H04W 76/15; H04L 41/5067
See application file for complete search history.

(56) References Cited

U.S. PATENT DOCUMENTS

2022/0217560 A1 7/2022 Kumar et al.
2024/0080934 A1 3/2024 Kim
2025/0374101 A1* 12/2025 He ........................ H04W 24/10

FOREIGN PATENT DOCUMENTS

KR 10-2468294 B1 11/2022
KR 10-2023-0149694 A 10/2023
WO WO-2024072273 A1 * 4/2024 ............ H04W 24/08
WO WO-2024091158 A1 * 5/2024 ......... H04L 41/5067

OTHER PUBLICATIONS

ZTE Corporation et al., Discussion on QoE measurement for NR-DC, R2-2212289, 3GPP TSG RAN WG2 #120-e, Toulouse, France, Nov. 14-18, 2022.

(Continued)

*Primary Examiner* — Thai Dinh Hoang
(74) *Attorney, Agent, or Firm* — Jefferson IP Law, LLP

(57) ABSTRACT

This disclosure relates to 5$^{th}$ generation (5G) or 6$^{th}$ generation (6G) communication systems to support higher data rates. A method performed by a secondary node (SN) in a wireless communication system is provided. The method includes transmitting, to a user equipment (UE), first configuration information associated with a quality of experience (QoE) measurement, wherein the first configuration information includes an indicator indicating whether a segmentation of a report of the QoE measurement on a signaling radio bearer (SRB) associated with the report of the QoE measurement to the SN is allowed, and receiving, from the UE, the report of the QoE measurement based on the indicator.

18 Claims, 15 Drawing Sheets

(56) References Cited

OTHER PUBLICATIONS

Huawei et al., Discussion on QoE measurements in NR-DC, R2-2212193, 3GPP TSG-RAN WG2 Meeting #120, Toulouse, France, Nov. 14-18, 2022.
Xiaomi, Discussion on QoE configuration and reporting in NR-DC, R3-226726, 3GPP TSG-RAN3 Meeting #118, Toulouse, France, Nov. 14-18, 2022.
ZTE et al. Discussion on QoE configuration and reporting in NR-DC, R3-225819, 3GPP TSG-RAN WG3 #117bis-e, Oct. 10-18, 2022.
International Search Report and Written opinion dated Apr. 8, 2024, issued in International Application No. PCT/KR2023/022019.
Huawei et al., Discussion on QoE measurements in NR-DC, R2-2210205, 3GPP TSG-RAN WG2 Meeting #119bis-e, Online, Sep. 30, 2022.
Apple, Support of QoE in NR-DC, R2-2209785, 3GPP TSG-RAN WG2 Meeting #119bis-e, e-Meeting, Sep. 30, 2022.
Ericsson, NR QoE Measurement Triggering, Configuration, Collection and Reporting, R2-2007600, 3GPP TSG-RAN WG2 Meeting #109-e, Electronic meeting, Aug. 6, 2020.
European Search Report dated Feb. 12, 2026, issued in European Application No. 23915033.7.

* cited by examiner

METHOD AND APPARATUS FOR CONFIGURING AND REPORTING QoE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0000279, filed on Jan. 2, 2023, in the Korean Intellectual Property Office, the disclosure of which is incorporated by reference herein in its entirety.

BACKGROUND

1. Field

The disclosure relates to the field of communications and to the operations of user equipments (UEs) and base stations. More particularly, the disclosure relates to a method for configuring and reporting quality of experience (QoE) to a UE with dual connectivity configured, and a UE, base station, and communication system related thereto.

2. Description of Related Art $5^{th}$ generation (5G) mobile communication technologies define broad frequency bands such that high transmission rates and new services are possible, and can be implemented in "sub 6 gigahertz (GHz)" bands such as 3.5 GHz, and in "above 6 GHz" bands, referred to as millimeter wave (mmWave), including 28 GHz and 39 GHz. In addition, it has been considered to implement $6^{th}$ generation (6G) mobile communication technologies (referred to as beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the initial development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are also ongoing discussions regarding improvement and performance enhancement of initial 5G mobile communication technologies in view of services to be supported by newer 5G mobile communication technologies, such as physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, a non-terrestrial network (NTN), which is UE-satellite direct communication for providing coverage in an area in which communication with terrestrial networks is unavailable, and positioning.

There is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR).

There is also ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that that will be connected to communication networks is expected to exponentially increase, and it is accordingly expected that enhanced functions and performances of 5G mobile communication systems and integrated operations of connected devices will be necessary. To this end, new research is scheduled in connection with extended Reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

In addition, the development of such a 5G mobile communication system includes a new waveform, full dimensional MIMO (FD-MIMO), array antennas for guaranteeing coverage in the THz band of 6G mobile communication technology, multi-antenna transmission technologies such as large scale antennas, metamaterial-based lenses and antennas to improve coverage of terahertz band signals, high-dimensional spatial multiplexing technology using orbital angular momentum (OAM), reconfigurable intelligent surface (RIS) technology, as well as full duplex technology to improve frequency efficiency and system network of 6G mobile communication technology, satellite. Additionally, AI may be utilized from the design stage and end-to-end development of AI-based communication technology that realizes system optimization by internalizing AI-supported functions and next-generation distributed computing technology that realizes complex services beyond the limits of terminal computing capabilities by utilizing ultra-high-performance communication and computing resources could be the basis for.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method that may effectively provide services in a wireless communication system.

Another aspect of the disclosure is to provide an apparatus and method that may effectively provide services in a wireless communication system.

Additional aspects will be set forth in part in the description which follows and, in part, will be apparent from the description, or may be learned by practice of the presented embodiments.

In accordance with an aspect of the disclosure, a method performed by a secondary node (SN) in a wireless communication system is provided. The method includes transmitting, to a user equipment (UE), first configuration information associated with a quality of experience (QoE) measurement, the first configuration information including an indicator indicating whether a segmentation of a report of the QoE measurement on a signaling radio bearer (SRB) associated with the report of the QoE measurement to the SN is allowed, and receiving, from the UE, the report of the QoE measurement based on the indicator.

In accordance with another aspect of the disclosure, a method performed by a user equipment (UE) in a wireless communication system is provided. The method includes receiving, from a master node (MN) or a second node (SN), first configuration information associated with quality of experience (QoE) measurement, the first configuration information including an indicator indicating whether a segmentation of a report of the QoE measurement on a signaling radio bearer (SRB) associated with the report of the QoE measurement to the SN is allowed, identifying, by the UE, an SRB for transmitting the report of the QoE measurement to the SN among at least one SRB, and transmitting, to the SN on the identified SRB, the report of the QoE measurement based on the indicator.

In accordance with another aspect of the disclosure, a secondary node (SN) in a wireless communication system is provided. The SN includes a transceiver, a controller coupled with the transceiver and configured to: transmit, to a user equipment (UE), first configuration information associated with a quality of experience (QoE) measurement, the first configuration information including an indicator indicating whether a segmentation of a report of the QoE measurement on a signaling radio bearer (SRB) associated with the report of the QoE measurement to the SN is allowed, and receive, from the UE, the report of the QoE measurement based on the indicator.

In accordance with another aspect of the disclosure, a user equipment (UE) in a wireless communication system is provided. The UE includes a transceiver, a controller coupled with the transceiver and configured to: receive, from a master node (MN) or a second node (SN), first configuration information associated with a quality of experience (QoE) measurement, the first configuration information including an indicator indicating whether a segmentation of a report of the QoE measurement on a signaling radio bearer (SRB) associated with the report of the QoE measurement to the SN is allowed, identify an SRB for transmitting the report of the QoE measurement to the SN among at least one SRB, and transmit, to the SN on the identified SRB, the report of the QoE measurement based on the indicator.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1O is a block diagram illustrating a configuration of an NR base station according to an embodiment of the disclosure.

Throughout the drawings, it should be noted that like reference numbers are used to depict the same or similar elements, features, and structures.

DETAILED DESCRIPTION

Figure 1A:
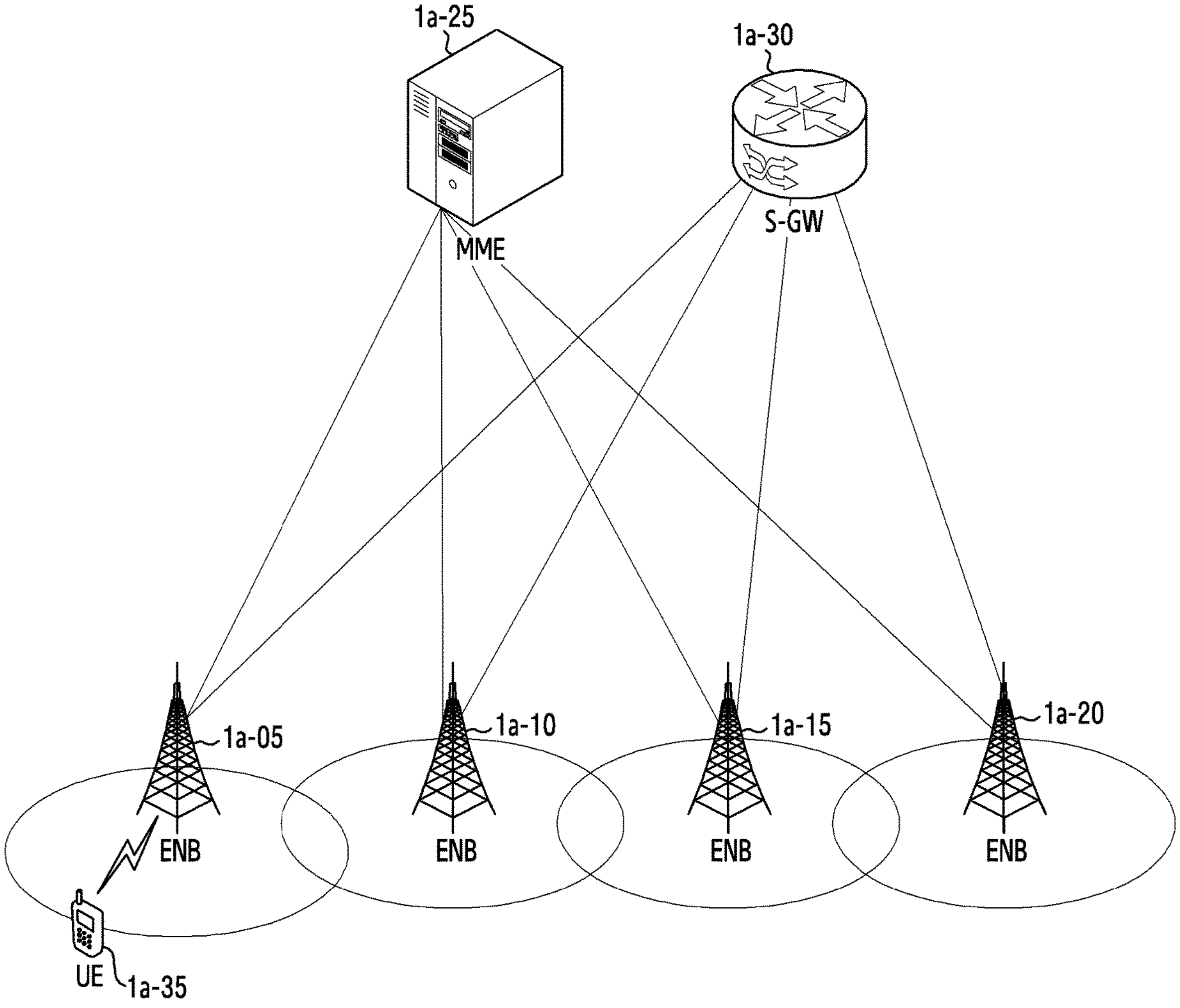
FIG. 1A is a diagram illustrating a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components in the attached drawings are exaggerated, omitted, or schematically shown. Additionally, the size of each component does not entirely reflect its actual size. In each drawing, identical or corresponding components are assigned the same reference numbers.

The advantages and features of the disclosure and methods for achieving them will become clear by referring to the embodiments described in detail below along with the accompanying drawings. However, the disclosure is not limited to the embodiments disclosed below and may be implemented in various different forms, and only the embodiments are intended to ensure that the disclosure is complete, and those skilled in the art It is provided to fully inform the scope of the disclosure, and the disclosure is defined only by the scope of the claims. Like reference numerals refer to like elements throughout the disclosure.

At this time, it will be understood that each block of the processing flow diagrams and combinations of the flow diagram diagrams can be performed by computer program instructions. These computer program instructions can be mounted on a processor of a general-purpose computer, special-purpose computer, or other programmable data processing equipment, so that the instructions performed through the processor of the computer or other programmable data processing equipment are described in the flow chart block(s). It creates the means to perform functions. These computer program instructions may also be stored in computer-usable or computer-readable memory that can be directed to a computer or other programmable data processing equipment to implement a function in a particular manner, so that the computer-usable or computer-readable memory It is also possible to produce manufactured items containing instruction means that perform the functions described in the flowchart block(s). Computer program instructions can also be mounted on a computer or other programmable data processing equipment, so that a series of operational steps are performed on the computer or other programmable data processing equipment to create a process that is executed by the computer, thereby generating a process that is executed by the computer or other programmable data processing equipment. Instructions that perform processing equipment may also provide steps for executing the functions described in the flow diagram block(s).

Additionally, each block may represent a module, segment, or portion of code that includes one or more executable instructions for executing specified logical function(s). Additionally, it should be noted that in some alternative execution examples it is possible for the functions mentioned in the blocks to occur out of order. For example, it is possible for two blocks shown in succession to be performed substantially simultaneously, or it is possible for the blocks to be performed in reverse order depending on the corresponding function.

At this time, the term '~unit' used in this embodiment refers to software or hardware components such as Field Programmable Gate Array (FPGA) or Application Specific Integrated Circuit (ASIC), and '~unit' performs certain roles. do. However, '~part' is not limited to software or hardware. The '~part' may be configured to reside in an addressable storage medium and may be configured to reproduce on one or more processors. Therefore, as an example, '~part' refers to components such as software components, object-oriented software components, class components, and task components, processes, functions, properties, and procedures, subroutines, segments of program code, drivers, firmware, microcode, circuitry, data, databases, data structures, tables, arrays, and variables. The functions provided within the components and 'parts' may be combined into a smaller number of components and 'parts' or may be further separated into additional components and 'parts'. Additionally, components and 'parts' may be implemented to regenerate one or more central processing units (CPUs) within a device or a secure multimedia card. Additionally, in the embodiment, '~part' may include one or more processors. In the following description of the disclosure, if it is determined that a detailed description of a related known function or configuration may unnecessarily obscure the gist of the disclosure, The detailed explanation will be omitted. Hereinafter, embodiments of the disclosure will be described with reference to the attached drawings.

Terms used in the following description to identify a connection node, a term referring to network entities, a term referring to messages, a term referring to an interface between network objects, and a term referring to various types of identification information. The following are examples for convenience of explanation. Accordingly, the disclosure is not limited to the terms described below, and other terms referring to objects having equivalent technical meaning may be used.

For convenience of description below, the disclosure uses terms and names defined in the 3rd Generation Partnership Project Long Term Evolution (3GPP LTE) standard. However, the disclosure is not limited by the above terms and names, and can be equally applied to systems complying with other standards. In the disclosure, evolved Node B (eNB) may be used interchangeably with gNB for convenience of explanation. That is, a base station described as an eNB may represent a gNB.

For convenience of description below, the disclosure uses terms and names defined in the 3rd Generation Partnership Project (3GPP) Long Term Evolution (LTE) standard. However, the disclosure is not limited by the above terms and names, and can be equally applied to systems complying with other standards. In this disclosure, eNB may be used interchangeably with gNB for convenience of explanation. That is, a base station described as an eNB may represent a gNB.

Hereinafter, the base station is the entity that performs resource allocation for the terminal and may be at least one of gNode B, eNode B, Node B, Base Station (BS), wireless access unit, base station controller, or node on the network. A terminal may include a User Equipment (UE), Mobile Station (MS), a cellular phone, a smartphone, a computer, or a multimedia system capable of performing communication functions. Of course, it is not limited to the above examples.

In particular, the disclosure is applicable to 3GPP NR (5th generation mobile communication standard). In addition, this disclosure provides intelligent services (e.g., smart home, smart building, smart city, smart car or connected car, healthcare, digital education, retail, security and safety-related services) based on 5G communication technology and IoT-related technology. etc.) can be applied. In this disclosure, eNB may be used interchangeably with gNB for convenience of explanation. That is, a base station described as an eNB may represent a gNB. Additionally, the term terminal can refer to mobile phones, NB-IoT devices, sensors, as well as other wireless communication devices.

Wireless communication systems have moved away from providing early voice-oriented services to, for example, 3GPP's High Speed Packet Access (HSPA), Long Term Evolution (LTE) or Evolved Universal Terrestrial Radio Access (E-UTRA), and LTE-Advanced. Broadband wireless that provides high-speed, high-quality packet data services such as communication standards such as (LTE-A), LTE-Pro, 3GPP2's High Rate Packet Data (HRPD), Ultra Mobile Broadband (UMB), and Institute of Electrical and Electronics Engineer's (IEEE's) 802.16e. It is evolving into a communication system.

As a representative example of a broadband wireless communication system, the LTE system uses Orthogonal Frequency Division Multiplexing (OFDM) in the downlink (DL), and Single Carrier Frequency Division Multiple Access (SC-FDMA) in the uplink (UL).) method is adopted. Uplink refers to a wireless link in which a terminal (UE; User Equipment or MS; Mobile Station) transmits data or control signals to a base station (eNode B or BS; Base Station), and downlink refers to a wireless link in which the base station transmits data or control signals to the terminal. It refers to a wireless link that transmits signals. The multiple access method described above differentiates each user's data or control information by allocating and operating the time-frequency resources to carry data or control information for each user so that they do not overlap, that is, orthogonality is established.

As a future communication system after LTE, that is, the 5G communication system must be able to freely reflect the various requirements of users and service providers, so services that simultaneously satisfy various requirements must be supported. Services considered for the 5G communication system include Enhanced Mobile BroadBand (eMBB), massive Machine Type Communication (mMTC), and Ultra Reliability Low Latency Communication (URLLC).

According to one embodiment, eMBB may aim to provide more improved data transmission rates than those supported by existing LTE, LTE-A, or LTE-Pro. For example, in a 5G communication system, eMBB must be able to provide a peak data rate of 20 Gbps in the downlink and 10 Gbps in the uplink from the perspective of one base station. In addition, the 5G communication system may need to provide the maximum transmission rate and at the same time provide an increased user perceived data rate. In order to meet these requirements, the 5G communication system may require improvements in various transmission and reception technologies, including more advanced multi-antenna (MIMO; Multi Input Multi Output) transmission technology. In addition, while the current LTE transmits signals using a maximum of 20 MHz transmission bandwidth in the 2 GHz band, the 5G communication system uses a frequency bandwidth wider than 20 MHz in the 3 to 6 GHz or above 6 GHz frequency band, meeting the requirements of the 5G communication system. Data transfer speed can be satisfied.

At the same time, mMTC is being considered to support application services such as Internet of Things (IoT) in 5G communication systems. In order to efficiently provide the Internet of Things, mMTC may require support for access to a large number of terminals within a cell, improved coverage of terminals, improved battery time, and reduced terminal costs. Since the Internet of Things provides communication functions by attaching various sensors and various devices, it must be able to support a large number of terminals (for example, 1,000,000 terminals/km2) within a cell. Additionally, due to the nature of the service, terminals supporting mMTC are likely to be located in shadow areas that cannot be covered by cells, such as the basement of a building, so wider coverage may be required compared to other services provided by the 5G communication system. Terminals that support mMTC must be composed of low-cost terminals, and since it is difficult to frequently replace the terminal's battery, a very long battery life time, such as 10 to 15 years, may be required.

Lastly, in the case of URLLC, it is a cellular-based wireless communication service used for specific purposes (mission-critical), such as remote control of robots or machinery, industrial automation, It can be used for services such as unmanned aerial vehicles, remote health care, and emergency alerts. Therefore, the communication provided by URLLC may need to provide very low latency (ultra-low latency) and very high reliability (ultra-reliability). For example, a service supporting URLLC must satisfy an air interface latency of less than 0.5 milliseconds and may have a packet error rate of less than 10-5. Therefore, for services supporting URLLC, the 5G system must provide a smaller Transmit Time Interval (TTI) than other services, and at the same time, a design that requires allocating wide resources in the frequency band to ensure the reliability of the communication link may be required.

Hereafter, the operating principle of the disclosure will be described in detail with reference to the attached drawings. In explaining the disclosure below, if a detailed description of a related known function or configuration is determined to unnecessarily obscure the gist of the disclosure, the detailed description will be omitted. In addition, the terms described below are terms defined in consideration of the functions in the disclosure, and may vary depending on the intention or custom of the user or operator. Therefore, the definition should be made based on the contents throughout this disclosure.

For the same reason, some components in the attached drawings are exaggerated, omitted, or schematically shown. Additionally, the size of each component does not entirely reflect its actual size. In each drawing, identical or corresponding components are assigned the same reference numbers.

The advantages and features of the disclosure and methods for achieving them will become clear by referring to the embodiments described in detail below along with the accompanying drawings. However, the disclosure is not limited to the embodiments disclosed below and may be implemented in various different forms, and only the embodiments are intended to ensure that the disclosure is complete, and those skilled in the art It is provided to fully inform the scope of the disclosure, and the disclosure is defined only by the scope of the claims. Like reference numerals refer to like elements throughout the disclosure.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing integrated circuit (IC), a microprocessor unit (MPU), a system on chip (SoC), an integrated circuit (IC), or the like.

FIG. 1A is a diagram illustrating a structure of an LTE system according to an embodiment of the disclosure.

Referring to FIG. 1A, as illustrated, a radio access network of the LTE system consists of a next-generation base station (hereinafter, evolved Node B (ENB), Node B or base station) 1*a*-05, 1*a*-10, 1*a*-15, and 1*a*-20, a mobility management entity (MME) 1*a*-25, and a serving-gateway (S-GW) 1*a*-30. A user equipment (UE) (hereinafter, UE or terminal) 1*a*-35 accesses an external network through the ENBs 1*a*-05 to 1*a*-20 and the S-GW 1*a*-30.

In FIG. 1A, the ENBs 1*a*-05 to 1*a*-20 corresponds to the existing Node B of a universal mobile telecommunication system (UMTS) system. The ENBs are connected to the UE 1*a*-35 through a radio channel and perform a more complex role than the existing Node B. In the LTE system, because all user traffic, including real-time services such as Voice over IP (VoIP) through Internet protocol, may be serviced through shared channels, a device for scheduling by collecting state information such as buffer state of the UEs, available transmission power state, channel state, etc. may be required, and the ENBs 1*a*-05 to 1*a*-20 are responsible for this. One ENB may typically control multiple cells. For example, in order to implement a transmission rate of 100 Mbps, the LTE system may use, for example, orthogonal frequency division multiplexing (hereinafter, referred to as OFDM) in a 20 MHz bandwidth as a radio access technology. Of course, the technologies not limited to the above examples. In addition, the ENBs 1*a*-05 to 1*a*-20 may apply an adaptive modulation & coding (hereinafter, referred to as AMC) scheme determining a modulation scheme and a channel coding rate based on the channel state of the UE. The serving gateway (S-GW) 1*a*-30 is a device that provides a data bearer, and generates or removes the data bearer under the control of the MME 1*a*-25. The mobility management entity (MME) is a device in charge of various control functions as well as a mobility management function for the UE, and connected to a plurality of base stations.

Figure 1B:
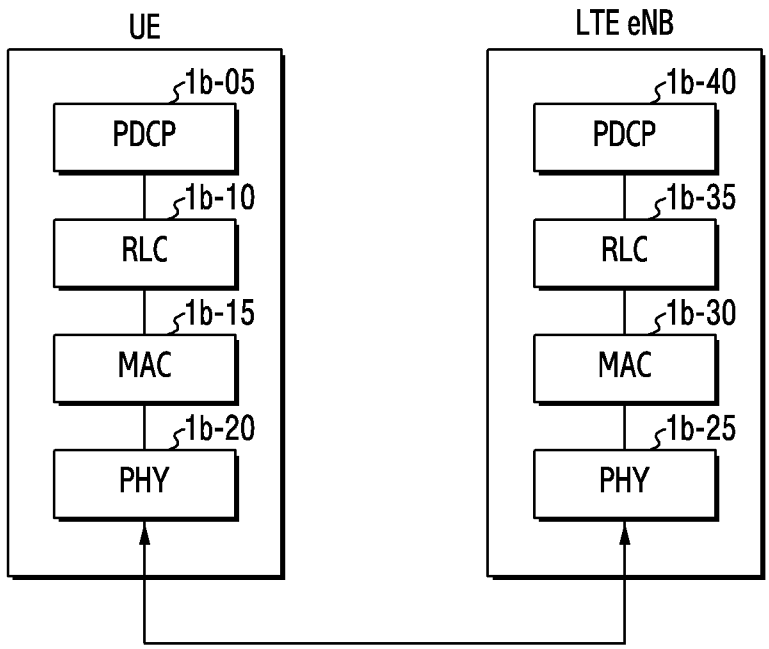
FIG. 1B is a diagram illustrating a radio protocol structure in an LTE system according to an embodiment of the disclosure.

FIG. 1B is a diagram illustrating a radio protocol structure in an LTE system according to an embodiment of the disclosure.

Referring to FIG. 1B, the radio protocol of the LTE system may include a packet data convergence protocol (PDCP) 1*b*-05 and 1*b*-40, a radio link control (RLC) 1*b*-10 and 1*b*-35, and a medium access control (MAC) 1*b*-15 and 1*b*-30 in the UE and ENB, respectively. The packet data convergence protocol (PDCP) 1*b*-05 and 1*b*-40 may be responsible for operations of IP header compression/decompression, etc. Main functions of the PDCP are summarized as follows. Of course, it is not limited to the examples below.

Header compression and decompression: robust header compression (ROHC) only
Transfer of user data
1*n*-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link control (hereinafter, referred to as RLC) 1*b*-10 and 1*b*-35 may perform the ARQ operation and the like by reconfiguring a PDCP packet data unit (PDU) to an appropriate size. Main functions of the RLC are summarized below. Of course, it is not limited to the examples below.

Transfer of upper layer PDUs
Error correction through ARQ (only for acknowledge mode (AM) data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 1*b*-15 and 1*b*-30 may be connected to several RLC layers configured in one UE, and perform operations of multiplexing RLC PDUs into MAC PDUs and demultiplexing RLC PDUs from MAC PDUs. Main functions of the MAC are summarized as follows. Of course, it is not limited to the examples below.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding The physical layers 1b-20 and 1b-25 channel-code and modulate upper layer data, make OFDM symbols and transmit the OFDM symbols through a radio channel, or demodulate and channel-decode the OFDM symbols received through the radio channel and transmit them to upper layers. Of course, operations are not limited to the above examples.

Figure 1C:
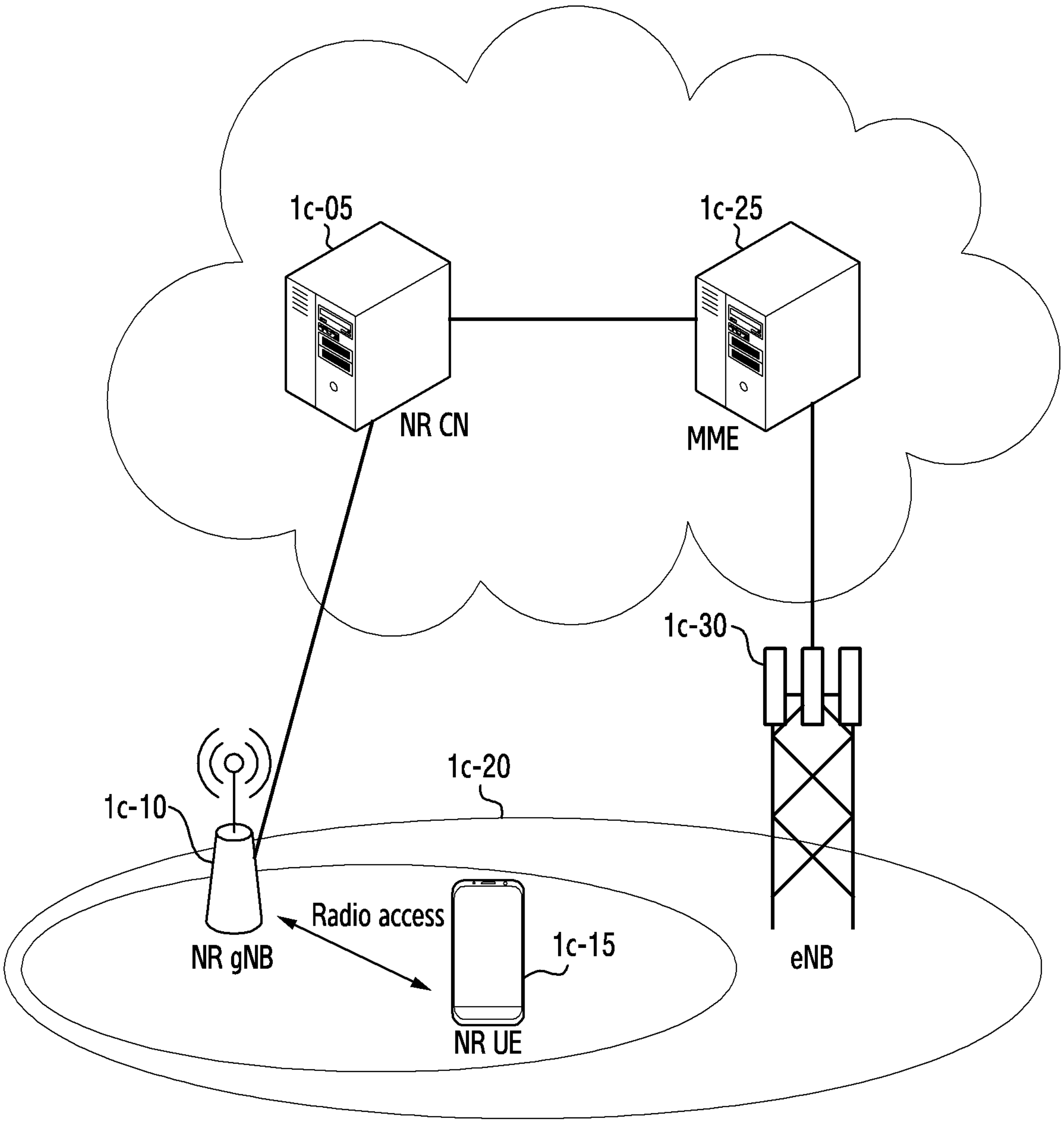
FIG. 1C is a diagram illustrating the structure of a next-generation mobile communication system according to an embodiment of the disclosure.

FIG. 1C is a diagram illustrating a structure of a next-generation mobile communication system according to an embodiment of the disclosure.

Referring to FIG. 1C, as illustrated, a radio access network of the wireless communication system (hereinafter, next-generation mobile communication system, NR or 5G) may be composed of a next-generation base station (e.g., a new radio (NR) node B, hereinafter, NR gNB or NR base station) 1e-10 and a new radio core network (NR CN) 1c-05. A new radio (NR) user equipment (hereinafter, NR UE or terminal) 1c-15 may access an external network through the NR gNB 1c-10 and the NR CN 1c-05.

In FIG. 1C, the NR gNB 1c-10 may correspond to an evolved Node B (eNB) of the existing LTE system. The NR gNB may be connected to the NR UE 1c-15 through a radio channel and may provide a service superior to that of the existing Node B. In the next-generation mobile communication system, because all user traffic is serviced through the shared channel, a device for scheduling by collecting state information such as a buffer state of the UEs, an available transmission power state, a channel state, etc. may be required, and the NR gNB 1c-10 may be responsible for this. One NR gNB may usually control multiple cells.

According to an embodiment of the disclosure, the next-generation mobile communication system may have a bandwidth greater than or equal to the existing maximum bandwidth to implement ultra-high-speed data transmission compared with current LTE, and use additional beamforming technology by using orthogonal frequency division multiplexing (hereinafter, referred to as OFDM) as a radio access technology. In addition, according to an embodiment of the disclosure, the NR gNB(1c-10) may apply an adaptive modulation & coding (hereinafter, referred to as AMC) scheme for determining a modulation scheme and a channel coding rate according to the channel state of the UE. The NR CN 1c-05 may perform functions such as mobility support, bearer configuration, QoS configuration, and the like. The NR CN 1c-05 is a device in charge of various control functions as well as a mobility management function for the UE, and may be connected to a plurality of base stations. In addition, the next-generation mobile communication system may be linked with the existing LTE system, and the NR CN may be connected to an MME 1c-25 through a network interface. The MME may be connected to an existing base station eNB 1c-30.

Figure 1D:
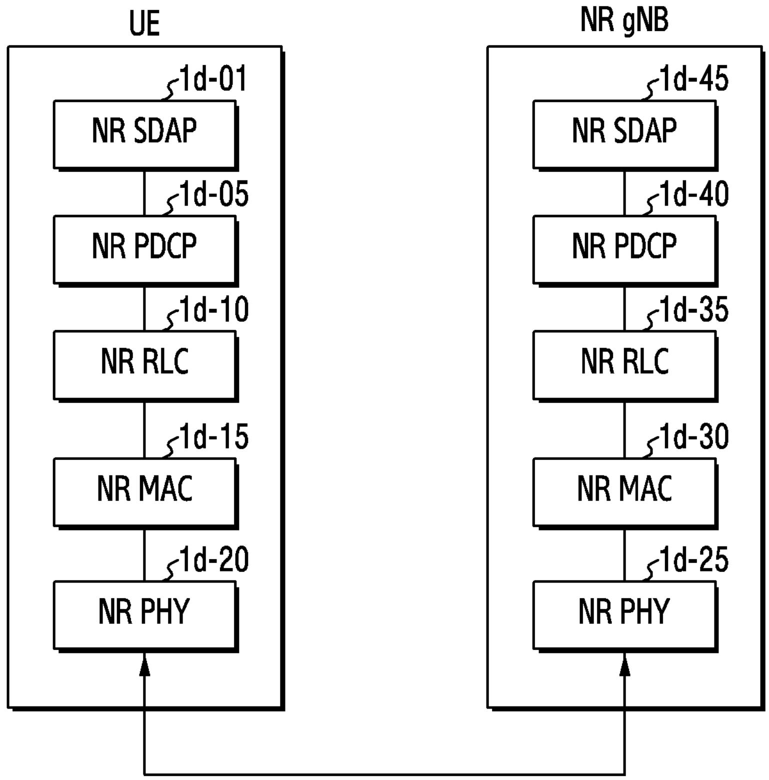
FIG. 1D is a diagram illustrating a radio protocol structure of a next-generation mobile communication system according to an embodiment of the disclosure.

FIG. 1D is a diagram illustrating a radio protocol structure of a next-generation mobile communication system according to an embodiment of the disclosure.

Referring to FIG. 1D, the radio protocol of the next-generation mobile communication system may include an NR service data adaptation protocol (SDAP) 1d-01 and 1d-45, NR packet data convergence protocol (PDCP) 1d-05 and 1d-40, NR radio link control (RLC) 1d-10 and 1d-35, and NR medium access control (MAC) 1d-15 and 1d-30 in a UE and an NR base station, respectively.

According to an embodiment of the disclosure, main functions of the NR SDAP 1d-01 and 1d-45 may include some of the following functions. Of course, it is not limited to the examples below.

Transfer of user plane data
Mapping between a QoS flow and a DRB for both DL and UL
Marking QoS flow ID in both DL and UL packets
Reflective QoS flow to DRB mapping for the UL SDAP PDUs With respect to the SDAP layer, the UE may be configured with a radio resource control (RRC) message whether to use a SDAP layer header or the function of the SDAP layer for each PDCP layer, for each bearer, or for each logical channel. When the SDAP header is configured, an NAS QoS reflected configuration 1a-bit indicator (NAS reflective QoS) and an AS QoS reflected configuration 1a-bit indicator (AS reflective QoS) of the SDAP header may instruct the UE to update or reconfigure mapping information for uplink and downlink QoS flows and data bearers. The SDAP header may include QoS flow ID information indicating the QoS. The QoS information may be used as data processing priority, scheduling information, etc. to support a smooth service.

According to an embodiment of the disclosure, main functions of the NR PDCP 1d-05 and 1d-40 may include some of the following functions. Of course, it is not limited to the examples below.

Header compression and decompression (ROHC only)
Transfer of user data
1n-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink According to an embodiment of the disclosure, the reordering function of the NR PDCP may refer to a function of reordering PDCP PDUs received from a lower layer in order based on a PDCP sequence number (SN). the reordering function of the NR PDCP may include at least one of a function to transmit data to the upper layer in the rearranged order, a function to directly transmit data without considering the order, a function to record lost PDCP PDUs by rearranging the order, a function to report the state of lost PDCP PDUs to the transmitting side, and a function to request retransmission for lost PDCP PDUs.

According to an embodiment of the disclosure, main functions of the NR RLC 1d-10 and 1d-35 may include some of the following functions. Of course, it is not limited to the examples below.

Transfer of upper layer PDUs
1n-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to an embodiment of the disclosure, the in-sequence delivery of the NR RLC may refer to a function of sequentially delivering RLC SDUs received from a lower layer to an upper layer. The in-sequence delivery may include at least one of a function to reassemble and deliver divided RLC SDUs in a case where originally one RLC SDU is divided into several RLC SDUs and received, a function to rearrange received RLC PDUs based on RLC sequence number (SN) or PDCP sequence number (SN), a function to reorder and record lost RLC PDUs, a function to report the state of lost RLC PDUs to the transmitting side, a function to request retransmission of lost RLC PDUs, a function of sequentially delivering only the RLC SDUs before the lost RLC SDU to the upper layer when there is a missing RLC SDU, a function of sequentially delivering all RLC SDUs received before the timer starts to the upper layer if a predetermined timer has expired even if there is a lost RLC SDU, or a function of sequentially delivering all RLC SDUs received so far to the upper layer if a predetermined timer has expired even if there is a lost RLC SDU.

In addition, according to an embodiment of the disclosure, the NR RLC 1*d*-10 and 1*d*-35 may process RLC PDUs in the order they are received (regardless of the order of serial numbers and sequence numbers, in the order of arrival) to deliver the RLC PDUs to the PDCP device out of order (out-of-sequence delivery), and in the case of segments, the NR RLC 1*d*-10 and 1*d*-35 may receive segments stored in the buffer or to be received later, reconstruct the segments into one complete RLC PDU, and process and transmit the same to the PDCP device. The NR RLC 1*d*-10 and 1*d*-35 may not include a concatenation function, and may perform the concatenation function in the NR MAC layer or replace the concatenation function with a multiplexing function of the NR MAC layer. Of course, functions are not limited to the above examples.

The out-of-sequence delivery of the NR RLC 1*d*-10 and 1*d*-35 may include to a function of directly delivering RLC SDUs received from a lower layer to an upper layer regardless of order, and may include at least one of a function of reassembling and delivering in a case where originally one RLC SDU is divided into several RLC SDUs and received, a function of storing the RLC SN or PDCP SN of the received RLC PDUs, arranging the order, and recording the lost RLC PDUs.

According to an embodiment of the disclosure, the NR MAC 1*d*-15 and 1*d*-30 may be connected to several NR RLC layers configured in one UE, and the main functions of the NR MAC may include some of the following functions. Of course, it is not limited to the examples below.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding According to an embodiment of the disclosure, the NR PHY layers 1*d*-20 and 1*d*-25 may channel-code and modulate upper layer data, make OFDM symbols and transmit the OFDM symbols through a radio channel, or may demodulate and channel-decode the OFDM symbols received through the radio channel and transmit them to upper layers. Of course, operations are not limited to the above examples.

Figure 1E:
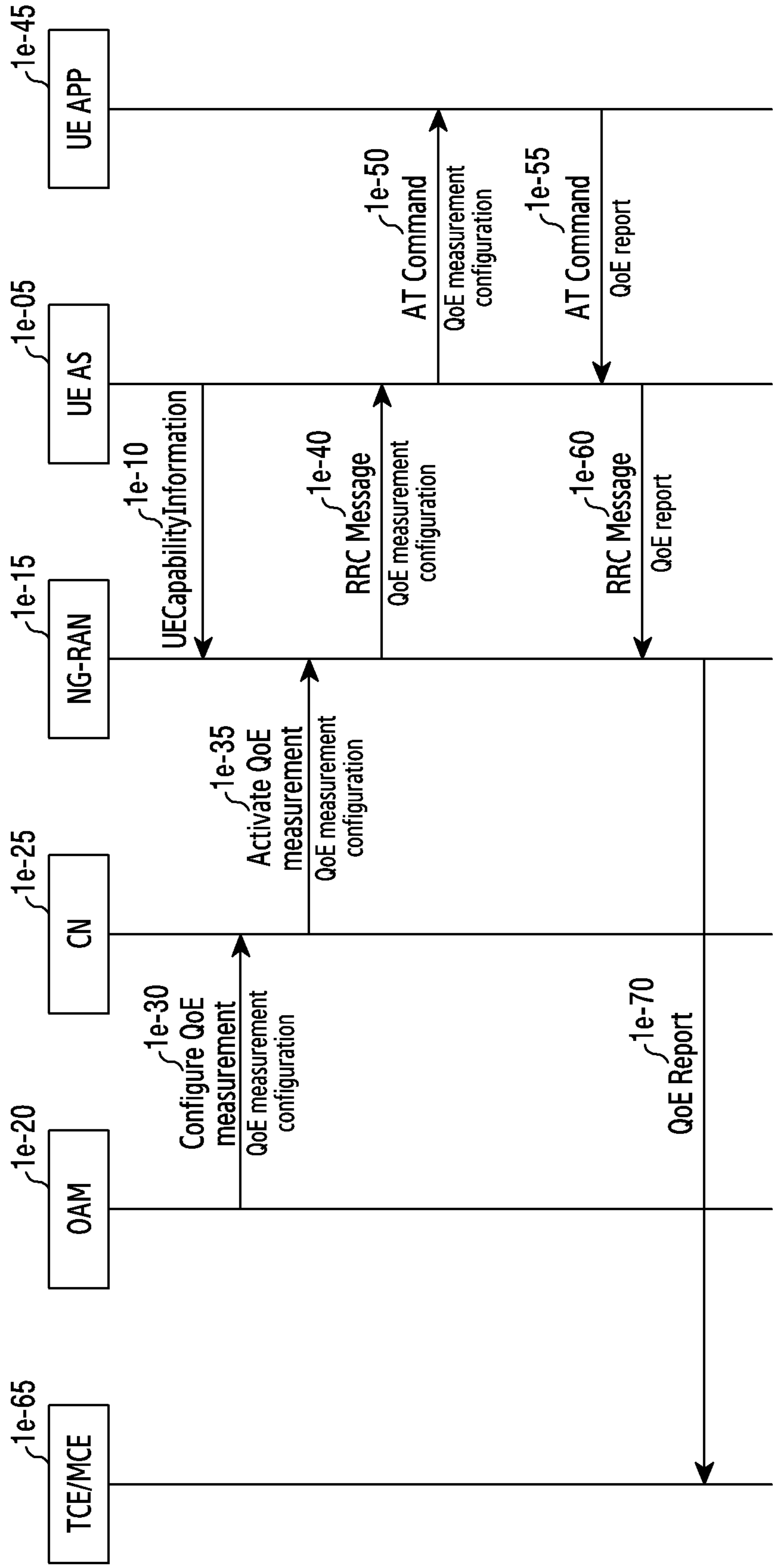
FIG. 1E is a flowchart illustrating a procedure for configuring/reporting signaling-based QoE measurement according to an embodiment of the disclosure.

FIG. 1E is a flowchart illustrating a procedure for configuring/reporting signaling-based quality of experience (QoE) measurement according to an embodiment of the disclosure.

Referring to FIG. 1E, a UE access stratum (AS) 1*e*-05 may store information indicating which quality of experience (QoE) measurement is supported through application layers measurements in a UE capability information message (UECapabilityInformation) and transmit the same to a base station 1*e*-15, in operation 1*e*-10. Additionally, the UE capability information message may include capability information on whether the UE AS 1*e*-05 may divide and transmit an RRC message (MeasurementReportAppLayer) reporting the QoE measurement result to the base station 1*e*-15. As an example, the UE capability information message may include parameters below.

TABLE 1

```
AppLayerMeasParameters-r17 ::=          SEQUENCE {
  qoe-Streaming-MeasReport-r17              ENUMERATED
  {supported}
OPTIONAL,
  qoe-MTSI-MeasReport-r17                 ENUMERATED {supported}
OPTIONAL,
  qoe-VR-MeasReport-r17                 ENUMERATED {supported}
OPTIONAL,
  ran-VisibleQoE-Streaming-MeasReport-r17    ENUMERATED
  {supported}
OPTIONAL,
  ran-VisibleQoE-VR-MeasReport-r17          ENUMERATED
  {supported}
OPTIONAL,
  ul-MeasurementReportAppLayer-Seg-r17       ENUMERATED
  {supported}
OPTIONAL,
  . . .
}
```

Additionally, the UE capability information message may include information on whether the UE supports QoE measurement through application layer measurements for multimedia broadcast multicast services (MBMS), extended reality (XR), and the like. In this case, the UE capability information message may store whether the QoE measurement is supported separately for multimedia broadcast services and multimedia multicast services, and may store whether the QoE measurement is supported commonly without distinction between multimedia broadcast services and multimedia multicast services. Additionally, whether the QoE measurement for multimedia broadcast services is supported may be included in the UE capability information message according to the RRC state for the multimedia broadcast services. As an example, the QoE measurement may be supported for multimedia broadcast services only in an RRC connected mode (RRC_CONNECTED), or may be supported for multimedia broadcast services only in an RRC idle mode (RRC_IDLE) and an RRC inactive mode (RRC_INACTIVE), or may be supported for multimedia broadcast services regardless of the RRC state.

In operation 1*e*-30, an operations administration and maintenance (OAM) 1*e*-20 may provide QoE measurement configuration information to a core network (CN) 1*e*-25.

In operation 1*e*-35, the CN 1*e*-25 may activate QoE measurement by transmitting the QoE measurement configuration information received in operation 1*e*-30 to the base station 1*e*-15.

In operation 1*e*-40, the base station 1*e*-15 may store the QoE measurement configuration information received in operation 1*e*-35 in a predetermined RRC message (e.g., RRCReconfiguration or RRCResume) and transmit the same to the UE AS 1*e*-05. The QoE measurement configuration information (AppLayerMeasConfig) stored in the predetermined RRC message may include parameters below.

TABLE 2

```
AppLayerMeasConfig-r17 ::=                    SEQUENCE {
      measConfigAppLayerToAddModList-r17          SEQUENCE (SIZE
(1..maxNrofAppLayerMeas-r17)) OF MeasConfigAppLayer-r17       OPTIONAL, -- Need N
      measConfigAppLayerToReleaseList-r17          SEQUENCE (SIZE
(1..maxNrofAppLayerMeas-r17)) OF MeasConfigAppLayerId-r17       OPTIONAL, -- Need N
      rrc-SegAllowed-r17                   ENUMERATED {enabled}
OPTIONAL, -- Need R
      . . .
}
MeasConfigAppLayer-r17 ::=                    SEQUENCE {
      measConfigAppLayer-Id-r17                         MeasConfigAppLayerId-r17,
      measConfigAppLayerContainer-r17                   OCTET STRING {SIZE (1..8000))
OPTIONAL, -- Need N
      serviceType-r17                 ENUMERATED {streaming, mtsi, vr, spare5, spare4,
spare3, spare2, spare1}          OPTIONAL, -- Need M
      pauseReporting                  BOOLEAN
OPTIONAL, -- Need M
      transmissionOfSessionStartStop            BOOLEAN
OPTIONAL, -- Need M
      ran-VisibleParameters-r17             SetupRelease {RAN-VisibleParameters-r17}
OPTIONAL, -- Need M
      . . .
}
RAN-VisibleParameters-r17::=           SEQUENCE {
      ran-VisiblePeriodicity-r17        ENUMERATED {ms120, ms240, ms460, ms640, ms1024}
OPTIONAL, -- Need S
      numberOfBufferLevelEntries-r17                    INTEGER (1..8)
OPTIONAL, -- Need R
      reportPlayoutDelayForMediaStartup-r17             BOOLEAN
OPTIONAL, -- Need M
      . . .
}
-- TAG-APPLAYERMEASCONFIG-STOP
-- ANISTOP
```

TABLE 3

| AppLayerMeasConfig field descriptions |
|---|
| measConfigAppLayerContainer<br>The field contains configuration of application layer measurements, see Annex L (normative) in TS 26.247 [68], clause 16.5 in TS 26.114 [69] and TS 26.118 [70]. |
| pauseReporting<br>The field indicates whether the transmission of measReportAppLayerContainer is paused or not. |
| ran-VisibleParameters<br>The field indicates whether RAN visible application layer measurements shall be reported or not. The field is optionally present when serviceType is set to streaming or vr. Otherwise, it is absent. |
| rrc-SegAllowed<br>This field indicates that RRC segmentation of MeasurementReportAppLayer is allowed. It may be present only if the UE supports RRC segmentation of the MeasurementReportAppLayer message in UL. |
| serviceType<br>Indicates the type of application layer measurement. Value streaming indicates Quality of Experience Measurement Collection for streaming services (see TS 26.247 [68]), value mtsi indicates Quality of Experience Measurement Collection for MTSI (see TS 26.114 [69]). value vr indicates Quality of Experience Measurement Collection for VR service (see TS 26.118 [70]). The network always configures serviceType when application layer measurements are initially configured and at fullConfig. |
| transmissionOfSessionStartStop<br>The field indicates whether the UE shall transmit indications when sessions in the application layer start and stop. The UE transmits a session start indication upon configuration of this field if a session already has started in the application layer. |

| RAN-VisibleParameters field descriptions |
|---|
| numberOfBufferLevelEntries<br>The field contains the maximum number of buffer level entries that can be reported for RAN visible application layer measurements. |
| ran-VisiblePeriodicity<br>The field indicates the periodicity of RAN visible reporting. Value ms120 indicates 120 ms, value ms240 indicates 240 ms and so on. |
| reportPlayoutDelayForMediaStartup<br>The field indicates whether the UE shall report Playout Delay for Media Startup for RAN visible application layer measurements. |

Additionally, the QoE measurement configuration information (AppLayerMeasConfig) may also include QoE measurement configuration information for multimedia broadcast services. As an example, multimedia broadcast services may be indicated in the serviceType included in the QoE measurement configuration information (AppLayerMeasConfig), or the QoE measurement configuration information for multimedia broadcast services may be included by introducing a separate indicator, or an indicator (e.g., mbs-SessionList) regarding whether to measure QoE for each MBS session may be included. The QoE measurement configuration information for multimedia broadcast services may be applied to all RRC states (RRC_IDLE, RRC_INACTIVE, and RRC_CONNECTED) of the UE or may be applied to at least one RRC state. That is, to which RRC states (any combination of RRC_IDLE, RRC_INACTIVE and RRC_CONNECTED) the QoE measurement configuration information for multimedia broadcast services is applied may be indicated in the QoE measurement configuration information (AppLayerMeasConfig). Alternatively, a new timer value for representing a QoE measurement execution period for multimedia broadcast services may be included. That is, when the new timer value is included, the UE may drive or re-drive a new timer with a new timer value received when receiving the AppLayerMeasConfig from the base station, or may drive or re-drive the new timer with the received new timer value when transitioning to the RRC idle mode or the RRC inactive mode. When the driven new timer expires, the UE may release the QoE measurement configuration information for multimedia broadcast services. For reference, the UE AS receiving the AppLayerMeasConfig may perform the procedure below.

1> if measConfigAppLayerToReleaseList is included in appLayerMeasConfig within RRCReconfiguration or RRCResume:

2> for each measConfigAppLayerId value included in the measConfigAppLayerToReleaseList:

3> forward the measConfigAppLayerId and inform upper layers about the release of the application layer measurement configuration including any RAN visible application layer measurement configuration;

3> discard any application layer measurement report received from upper layers;

3> consider itself not to be configured to send application layer measurement report for the measConfigAppLayerId.

1> if measConfigAppLayerToAddModList is included in appLayerMeasConfig within RRCReconfiguration or RRCResume:

2> for each measConfigAppLayerId value included in the measConfigAppLayerToAddModList:

3> if measConfigAppLayerContainer is included for the corresponding MeasConfigAppLayer configuration:

4> forward the measConfigAppLayerContainer, the measConfigAppLayerId and the serviceType to upper layers considering the serviceType;

3> consider itself to be configured to send application layer measurement report for the measConfigAppLayerId in accordance with 5.7.16;

3> forward the transmissionOjSessionStartStop, if configured, and measConfigAppLayerId to upper layers considering the serviceType;

3> if ran-VisibleParameters is set to setup and the parameters have been received:

4> forward the measConfigAppLayerId, the ran-VisiblePeriodicity, if configured, the numberOfBufferLevelEntries, if configured, and the reportPlayoutDelayForMediaStartup, if configured, to upper layers considering the serviceType;

3> else if ran-VisibleParameters is set to release:

4> forward the measConfigAppLayerId and inform upper layers about the release of the RAN visible application layer measurement configuration;

3> ifpauseReporting is set to true:

4> if at least one segment, but not all segments, of a segmented MeasurementReportAppLayer message containing an application layer measurement report associated with the measConfigAppLayerId has been submitted to lower layers for transmission:

5> submit the remaining segments of the MeasurementReportAppLayer message to lower layers for transmission;

4> suspend submitting application layer measurement report containers to lower layers for the application layer measurement configuration associated with the measConfigAppLayerId;

4> store any previously or subsequently received application layer measurement report containers associated with the measConfigAppLayerId for which no segment, or full message, has been submitted to lower layers for transmission;

3> else if pauseReporting is set to false and if transmission of application layer measurement report containers has previously been suspended for the application layer measurement configuration associated with the measConfigAppLayerId:

4> submit stored application layer measurement report containers to lower layers, if any, for the application layer measurements configuration associated with the measConfigAppLayerId;

4> resume submitting application layer measurement report containers to lower layers for the application layer measurement configuration associated with the measConfigAppLayerId;

In operation **1*e*-50, the UE AS 1*e*-05 receiving the QoE measurement configuration information (AppLayerMeasConfig) may deliver the QoE measurement configuration information (AppLayerMeasConfig) to an application layer (UE APP) 1*e*-45** of the UE through an AT command.

In operation **1*e*-55, the UE APP may perform QoE measurement according to the QoE measurement configuration information (AppLayerMeasConfig) received in operation 1*e*-50**, and report the measurement result to the UE AS through the AT command according to the configuration information.

In operation **1*e*-60, the UE AS 1*e*-05 may report the measurement result to the base station 1*e*-15 through a predetermined RRC message (e.g., MeasReportAppLayer) based on the information received in operation 1*e*-55. For reporting of QoE measurement results, the SRB4** may be used. The predetermined RRC message may include parameters below.

TABLE 4

```
MeasurementReportAppLayer-r17 ::=                SEQUENCE {
    criticalExtensions                  CHOICE {
      measurementReportAppLayer-r17              MeasurementReportAppLayer-r17-IEs,
      criticalExtensionsFuture              SEQUENCE { }
    }
}
MeasurementReportAppLayer-r17-IEs ::=            SEQUENCE {
    measurementReportAppLayerList-r17            MeasurementReportAppLayerList-r17,
    lateNonCriticalExtensions               OCTET STRING
OPTIONAL,
    nonCriticalExtension              SEQUENCE { }
OPTIONAL
}
MeasurementReportAppLayerList-r17 ::=            SEQUENCE (SIZE
(1..maxNrofAppLayerMeas-f17)} OF MeasReportAppLayer-r17
MeasReportAppLayer-r17 ::=              SEQUENCE {
    measConfigAppLayerId-r17                MeasConfigAppLayerId-r17,
```

TABLE 4-continued

```
    measReportAppLayerContainer-r17              OCTET STRING
OPTIONAL,
    appLayerSessionsStatus-r17               ENUMERATED {started, stopped}
OPTIONAL,
    ran-VisibleMeasurements-r17                  RAN-VisibleMeasurements-r17
OPTIONAL
}
RAN-VisibleMeasurements-r17 ::=                  SEQUENCE {
    appLayerBufferLevelList-r17                     SEQUENCE {SIZE (1..8)) OF
AppLayerBufferLevel-r17                               OPTIONAL,
    playoutDelayForMediaStartup-r17                        INTEGER (0..30000)
OPTIONAL,
    pdu-SessionsIdList-r17                          SEQUENCE {SIZE (1..maxNrofPDU-Sessions-r17)}
OF PDU-SessionID         OPTIONAL,
    . . .
}
```

As an example, the UE AS 1e-05 may transmit the predetermined RRC message including the QoE measurement result report to the base station 1e-15 based on the procedure below.

1> for each measConfigAppLayerId:

2> if the UE AS has received application layer measurement report from upper layers which has not been transmitted; and 2> if the application layer measurement reporting has not been suspended for the measConfigAppLayerId associated with the application layer measurement report according to clause 5.3.5.13d:

3> set the measReportAppLayerContainer in the MeasurementReportAppLayer message to the received value in the application layer measurement report;

2> set the measConfigAppLayerId in the MeasurementReportAppLayer message to the value of the measConfigAppLayerId received together with application layer measurement report information;

2> if session start or stop information has been received from upper layers for the measConfigAppLayerId:

3> set the appLayerSessionStatus to the received value of the application layer measurement information;

2> if RAN visible application layer measurement report has been received from upper layers:

3> for each appLayerBufferLevel value in the received RAN visible application layer measurement report:

4> set the appLayerBufferLevel values in the appLayerBufferLeve/List to the buffer level values received from the upper layer in the order with the first appLayerBufferLevel value set to the newest received buffer level value, the second appLayerBufferLevel value set to the second newest received buffer level value, and so on until all the buffer level values received from the upper layer have been assigned or the maximum number of values have been set according to appLayerBufferLevel, if configured;

3> set the playoutDelayForMediaStartup to the received value in the RAN visible application layer measurement report, if any;

3> for each PDU session ID value indicated in the received RAN visible application layer measurement report, if any:

4> set the PDU-SessionID field in the pdu-SessionIdList to the indicated PDU session ID value;

2> if the encoded RRC message is larger than the maximum supported size of one PDCP SDU specified in TS 38.323 [5]:

3> if the RRC message segmentation is enabled based on the field rrc-SegAllowed received in appLayerMeasConfig:

4> initiate the UL message segment transfer procedure as specified in clause 5.7.7;

3> else:

4> discard the RRC message;

2> else:

3> submit the MeasurementReportAppLayer message to lower layers for transmission upon which the procedure ends.

In operation 1e-70, the base station 1e-15 may deliver the measurement result report received in operation 1e-60 to the configured final destination (trace collection entity (TCE) or measurement collection entity (MCE)) 1e-65.

Figure 1F:
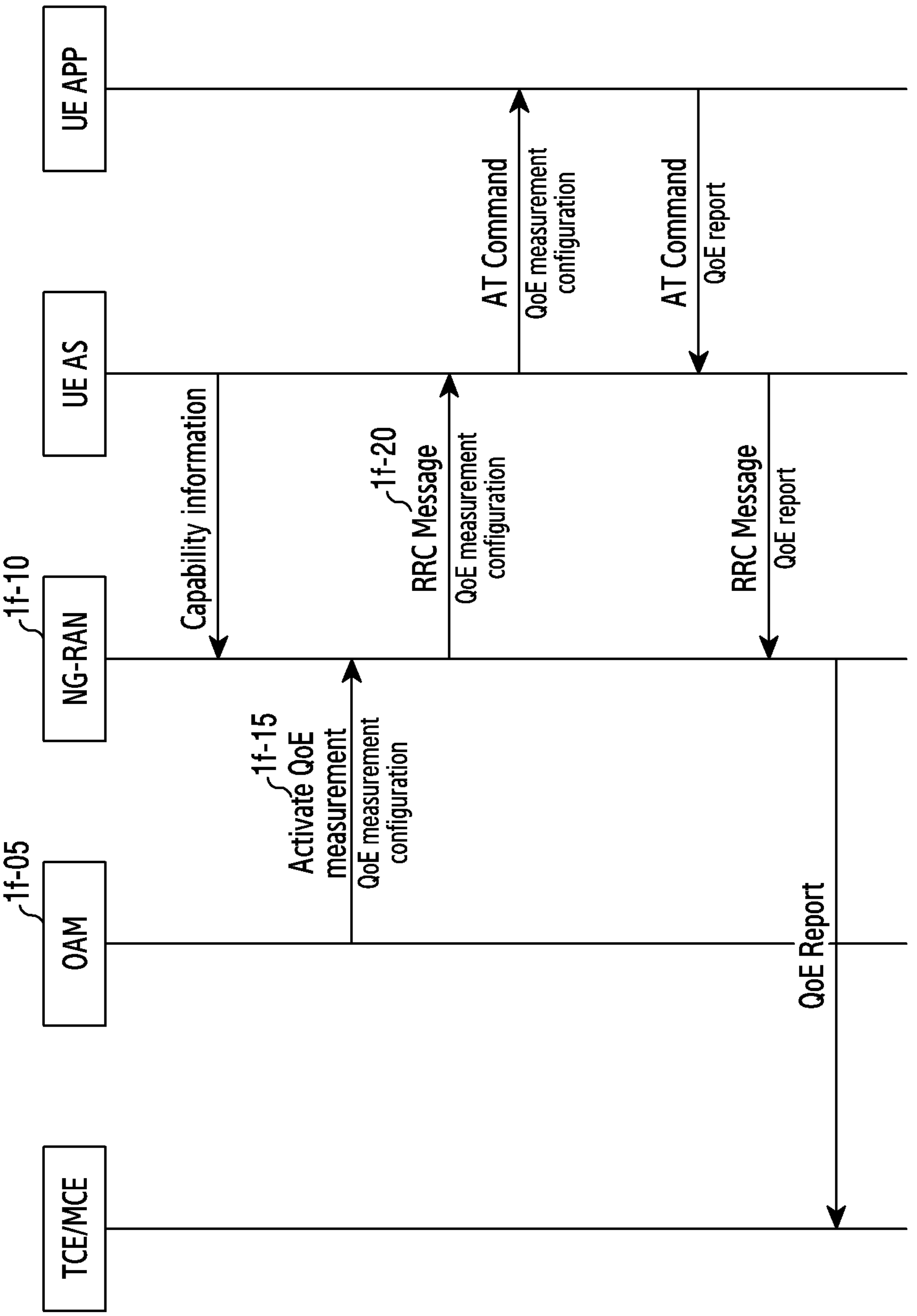
FIG. 1F is a flowchart illustrating a procedure for configuring/reporting management-based QoE measurement according to an embodiment of the disclosure.

FIG. 1F is a flowchart illustrating a procedure for configuring/reporting management-based QoE measurement according to an embodiment of the disclosure.

The management-based QoE configuring/reporting procedure may be partially similar to the procedure of FIG. 1E described above. Accordingly, in this disclosure, only the difference of the management-based method will be described below, and other procedures and descriptions may correspond to the description of FIG. 1E. In the management-based method, an OAM 1f-05 may directly transmit the QoE measurement configuration to a base station 1f-10 without going through a CN to activate the QoE measurement, in operation 1f-15. The base station receiving the QoE measurement configuration searches for a single UE or a plurality of UEs that meet various conditions (e.g., area scope, application layer capability, and service type). In addition, the base station 1f-10 may deliver the QoE measurement configuration to each of the UEs through an RRC message (e.g., RRCReconfiguration or RRCResume), in operation 1f-20. Other procedures and message types may correspond to the description (signaling-based method) of FIG. 1E.

Figure 1G:
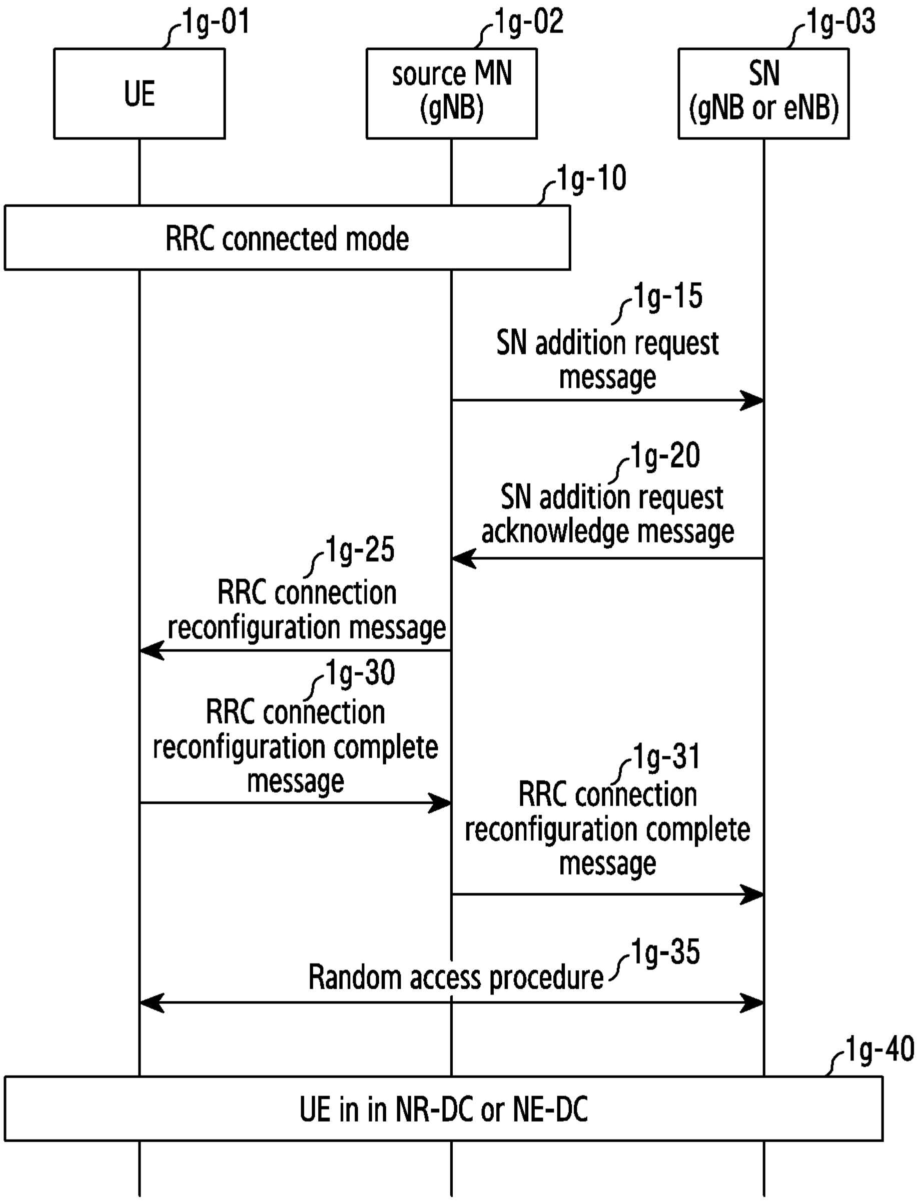
FIG. 1G is a diagram illustrating an entire flowchart of configuring NE-DC or NR-DC to a UE according to an embodiment of the disclosure.

FIG. 1G is a diagram illustrating the entire flowchart of configuring NE-DC or NR-DC to a UE according to an embodiment of the disclosure.

Referring to FIG. 1G, a UE 1g-01 may be in an RRC connected mode (RRC_CONNECTED) by establishing an RRC connection with the primary cell (PCell) or special cell (SpCell) of master node) of a source master node (MN)

1*g*-02, in operation 1*g*-10. The source MN's PCell may be connected to the 5G core network (CN), so the UE may receive services from the 5G CN.

In operation 1*g*-15, the source MN 1*g*-02 may initiate an SN addition procedure to add a secondary node (SN) 1*g*-03. As an example, in operation 1*g*-15, the source MN may transmit an SN addition request message (SgNB addition request or SN addition request) to the SN 1*g*-03.

In operation 1*g*-20, the SN 1*g*-03 may transmit an SN addition request acknowledge message (SgNB addition request acknowledge or SN addition request acknowledge) to the source MN 1*g*-02 in response to operation 1*g*-15. The SN addition request acknowledge message may include an RRC connection reconfiguration message (RRCReconfiguration in NR or RRCConnectionReconfiguration in LTE).

In operation 1*g*-25, the source MN 1*g*-02 may transmit the RRC connection reconfiguration message received in operation 1*g*-20 to the UE 1*g*-01 through a signaling radio bearer (SRB)1.

In operation 1*g*-30, the UE 1*g*-01 may apply the RRC connection reconfiguration message received in operation 1*g*-20 and transmit an RRC connection reconfiguration complete message (RRCReconfigurationComplete in NR or RRCConnectionReconfigurationComplete in LTE) to the source MN 1*g*-02 through the SRB1. The RRC connection reconfiguration complete message may include an SN complete message (SgNB reconfiguration complete or SN reconfiguration complete). The source MN 1*g*-02 may deliver the SN complete message to the SN 1*g*-03, in operation 1*g*-31.

In operation 1*g*-35, the RRC layer of the UE 1*g*-01 may initiate a random access procedure with the primary secondary cell (PSCell) of the SN 1*g*-03. For reference, the order of operations 1*g*-30, 1*g*-31, and 1*g*-35 may change depending on UE implementation. As an example, the UE 1*g*-01 may transmit the RRC connection reconfiguration complete message to the source MN 1*g*-02 after initiating or successfully completing the random access procedure for the PSCell.

In operation 1*g*-40, the UE 1*g*-01 may operate with NR-DC (PSCell is NR cell) or NE-DC (PSCell is LTE cell) configured.

Figure 1H:
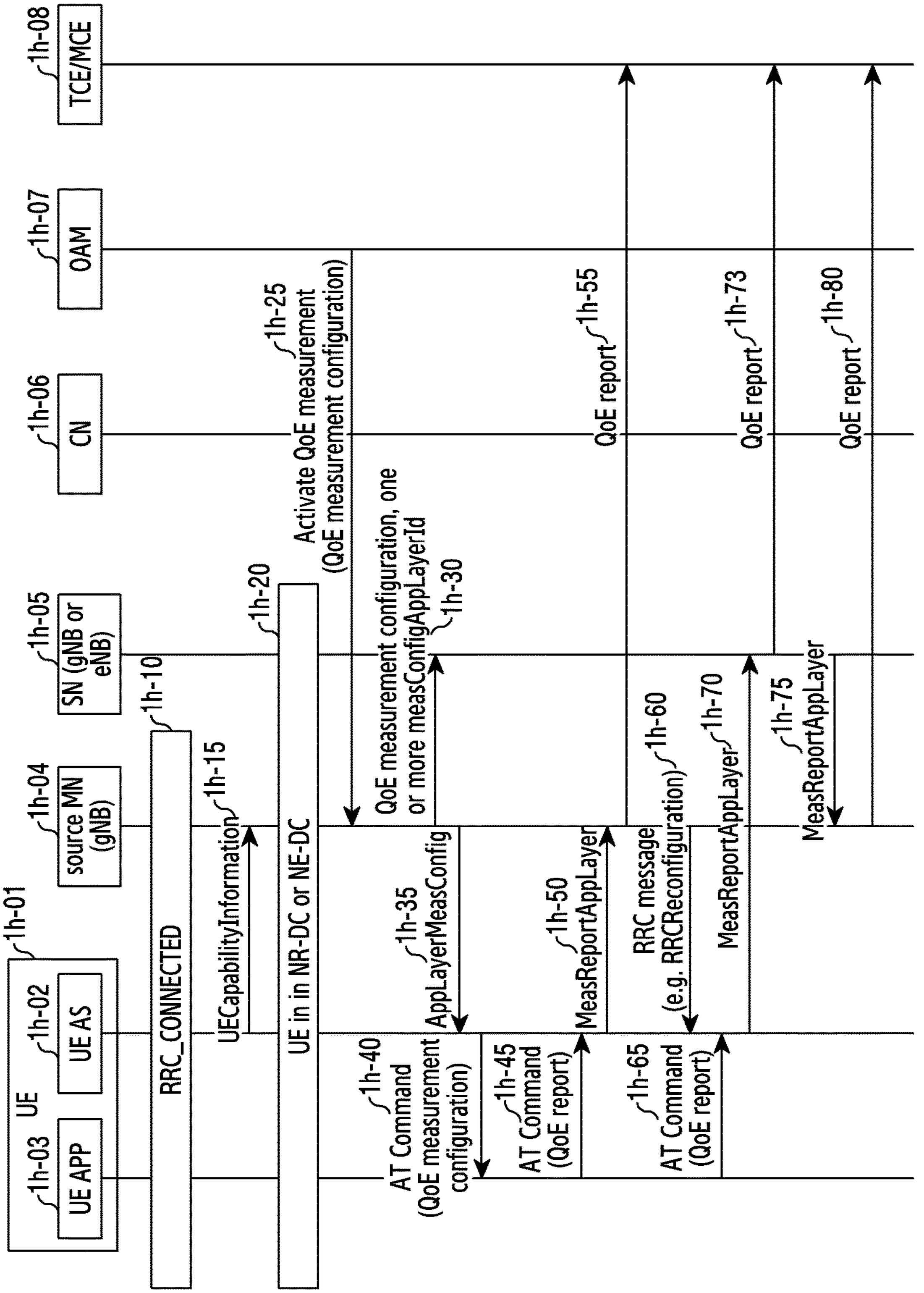
FIG. 1H is a flowchart illustrating a procedure in which a UE configured with NR-DC or NE-DC reports QoE measurement results to a base station based on QoE measurement configurations according to an embodiment of the disclosure.

FIG. 1H is a flowchart illustrating a procedure in which a UE configured with NR-DC or NE-DC reports QoE measurement results to a base station based on QoE measurement configurations according to an embodiment of the disclosure.

Referring to FIG. 1H, a UE 1*h*-01 may be in an RRC connected mode (RRC_CONNECTED) by establishing an RRC connection with a base station 1*h*-04 (e.g., a source master node (MN)), in operation 1*h*-10. In FIG. 1H, both the UE access stratum (UE AS) 1*h*-02 and the UE application layer (UE APP) 1*h*-03 may be collectively referred to as the UE 1*h*-01. In FIG. 1H, the base station 1*h*-04 may be referred to as a source master node (MN), and SN, PCell, SCell, PSCell, etc. may also be referred to as the base station 1*h*-04.

In operation 1*h*-15, the UE AS 1*h*-02 may transmit a UE capability information message (UECapabilityInformation) to the base station 1*h*-04. Information included in the UE capability information message may follow the above-described embodiment. Additionally, the message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation 1*h*-20, NR-DC (dual connectivity) or NE-DC may be configured for the UE 1*h*-01. The UE 1*h*-01 in the NR-DC or NE-DC may transmit and receive data from the source master node (MN) 1*h*-04 and a secondary node (SN) 1*h*-05. The flowchart in which the NR-DC or NE-DC is configured to the UE 1*h*-01 may follow the above-described embodiment.

In operation 1*h*-25, the operations administration and maintenance (OAM) 1*h*-07 may provide QoE measurement configuration information to the source MN 1*h*-04 to activate QoE measurement. The QoE measurement configuration information may include at least one of the service type on (serviceType) which QoE measurement is to be performed, the management collection entity (MCE) IP Address, QoE configuration information (measConfigAppLayerContainer), and the QoE reference. For reference, the above-described information may consist of one or more pieces.

In operation 1*h*-30, the source MN 1*h*-04 may deliver at least one of the QoE measurement configuration information received from the OAM 1*h*-07 to the SN 1*h*-05. Additionally, this disclosure proposes that the MN delivers the measConfigAppLayerId mapped to each measReportAppLayerContainer to the SN. This is to prevent the same measConfigAppLayerId from being allocated to the UE AS 1*h*-02 when the SN receives QoE measurement configuration information from the OAM in the future. This is because it cannot be determined which QoE reference or MCE IP address the measConfigAppLayerId is mapped to, so the QoE report may not be properly delivered to the final destination (the trace collection entity (TCE) or the measurement collection entity (MCE)) 1*h*-08 even if the source MN 1*h*-04 or the SN 1*h*-05 receives the QoE report from UE AS 1*h*-02 when the same measConfigAppLayerId is allocated to the UE AS 1*h*-02.

Accordingly, the MN may deliver at least one of serviceType, MCE IP Address, QoE reference, and measConfigAppLayerContainer mapped to each measConfigAppLayerId to the SN along with measConfigAppLayerId. Of course, the UE may report the QoE report to the MN without a separate indicator for the SN or with an explicit information element. Alternatively, the UE may instruct to change the reporting leg from the MN to the SN (or from the SN to the MN) for each measConfigAppLayerId and transmit MeasReportAppLayer to the MN and the SN accordingly.

As an example, when a specific measConfigAppLayerId is configured to report to the MN, the UE 1*h*-0I may transmit the QoE measurement result to the MN, and when another specific MeasConfigAppLayerId is configured to report to the SN, the UE 1*h*-01 may transmit the corresponding QoE measurement result to the SN. Additionally, the MN may configure the UE to report the entire QoE report (i.e., MeasReportAppLayer) to the SN, so the MN may need to deliver information (e.g., at least one of serviceType, MCE IP Address, QoE reference, and measConfigAppLayerContainer mapped to each measConfigAppLayerId) to the SN.

In operation 1*h*-35, the source MN 1*h*-04 may store QoE measurement configuration information (AppLayerMeasConfig) in a predetermined RRC message (e.g., RRCReconfiguration or RRCResume) through SRB1 and transmit the same to the UE AS 1*h*-02. Configurations for AppLayerMeasConfig and operations of the UE that receives the same may follow the above-described embodiment.

In operation 1*h*-40, the UE AS 1*h*-02 may deliver all or part of the AppLayerMeasConfig received through the AT command to the UE APP 1*h*-03.

In operation 1*h*-45, the UE APP 1*h*-03 may perform QoE measurement according to the configuration information received in operation 1*h*-40 and report the measurement results to the UE AS 1*h*-02 through the AT command according to the configuration information.

In operation 1*h*-50, the UE AS 1*h*-02 may report the measurement result to the source MN 1*h*-04 through the predetermined RRC message (e.g., MeasReportAppLayer) based on the information received in operation 1*h*-45. The signaling radio bearer (SRB)4 may be used to report the QoE measurement result. The information included in the predetermined RRC message and the procedure for transmitting the same may follow the above-described embodiment.

In operation 1*h*-55, the source MN 1*h*-04 may deliver the measurement result information received in operation 1*h*-50 to the final destination (TCE or MCE) 1*h*-08.

In operation 1*h*-60, because congestion occurs due to many loads (for example, services are required to many UEs), the source MN 1*h*-04 may transmit the predetermined RRC message to the UE AS 1*h*-02 to instruct the UE AS 1*h*-02 to report MeasReportAppLayer to the SN 1*h*-05. As an example, the predetermined RRC message may refer to an RRC connection reconfiguration message or an RRC connection resumption (RRCResume). Specifically, through the RRC message, the MN may instruct the UE to transmit MeasReportAppLayer to the SN through one of the following.

1 bit indicator with optional presence: If this indicator is absent, it means UE is requested to report MeasReportAppLayer to MCG or SCG. If this indicator is present, it means UE is requested to report MeasReportAppLayer to SCG or MCG.

CellGroupId: A value of one of maxSecondayCellGroups ranging from 0 to an integer value. If 0 or the field is absent, the UE transmits MeasReportAppLayer to the MCG. When 1 is indicated, the UE transmits MeasReportAppLayer to the first SCG. When one SCG is configured, the corresponding SCG refers to the first SCG. When multiple SCGs are configured for the UE, an integer value to enable the UE to transmit MeasReportAppLayer to a specific SCG is configured. When configured to CellGruoupId rather than 1 bit indicator, there is an advantage of having forward compatibility because there is no need to introduce additional signaling when two or more SCGs are configured to the UE in the future. As an example, the CellGroupId may be expressed in ASN.1 form of INTEGER (0 . . . maxSecondaryCellGroups).

Of course, by instructing each measConfigAppLayerId to change the reporting leg from the MN to the SN, the UE may transmit MeasReportAppLayer to the MN and the SN accordingly. In other words, when a specific measConfigAppLayerId is configured to report to the MN, the UE may transmit the QoE measurement result to the MN, and when another specific MeasConfigAppLayerId is configured to report to the SN, the UE may transmit the QoE measurement results for this specific MeasConfigAppLayerId to the SN.

For reference, before operation 1*h*-60, the source MN 1*h*-04 may inform a secondary node (SN) 1*i*-05 that the UE AS 1*h*-02 configures MeasReportAppLayer to report to the SN 1*h*-05. Accordingly, the SN may inform the MN whether to acknowledge. Alternatively, operation 1*h*-60 may be performed in operation 1*h*-35. For example, the MN may configure the UE AS to report to the SN when first configuring AppLayerMeasConfig. Alternatively, the UE may be instructed to change the reporting leg from the MN to the SN for each measConfigAppLayerId to transmit the MeasReportAppLayer to the MN and the SN accordingly.

As an example, when a specific measConfigAppLayerId is configured to report to the MN, the UE may transmit the QoE measurement result to the MN, and when another specific MeasConfigAppLayerId is configured to report to the SN, the UE may transmit the QoE measurement results for this specific MeasConfigAppLayerId to the SN. Additionally, the MN may configure the UE to report the entire QoE report (i.e., MeasReportAppLayer) to the SN, so the MN may need to deliver the above information (e.g., at least one of serviceType, MCE IP Address, QoE reference, and measConfigAppLayerContainer mapped to each measConfigAppLayerId) to the SN.

In operation 1*h*-65, the UE APP 1*h*-03 may perform QoE measurement according to the QoE measurement configuration information received in operation 1*h*-40, and report the measurement results to the UE AS 1*h*-02 through the AT command according to the configuration information.

In operation 1*h*-70, the UE AS 1*h*-02 may report the measurement results to the SN 1*h*-05 through a predetermined RRC message (e.g., MeasReportAppLayer) based on the information received in operation 1*h*-65. The new signaling radio bearer $(SRB)_x$ may be used to report the QoE measurement results. Of course, split SRB4, SRB3, SRB2, or the new split SRBx may be used.

In operation 1*h*-73, the SN 1*h*-05 may directly transmit the measurement result information received in operation 1*h*-70 to the final destination (the TCE or the MCE) 1*h*-08. Alternatively, the SN may deliver the MeasReportAppLayer received in operation 1*h*-70 to the source MN 1*h*-04, in operation 1*h*-75, and deliver the measurement result information received by the MN to the final destination (the TCE or the MCE)1*h*-08, in operation 1*h*-80.

In this embodiment, a method of coordination for each node is proposed so that the measConfigAppLayerId allocated to the UE does not have the same value for all nodes (MN and SNs) or all cell groups (i.e., measConfigAppLayerId is unique across the Cell Groups). Additionally, when congestion occurs in the MN or SN, a method is proposed in which the UE configured to report MeasReportAppLayer to the MN may report the MeasReportAppLayer to the SN (a method in which the UE configured to report MeasReportAppLayer to the SN may report the MeasReportAppLayer to the MN), and the signaling procedures and necessary elements of the MN and SN are proposed accordingly.

Figure 1I:
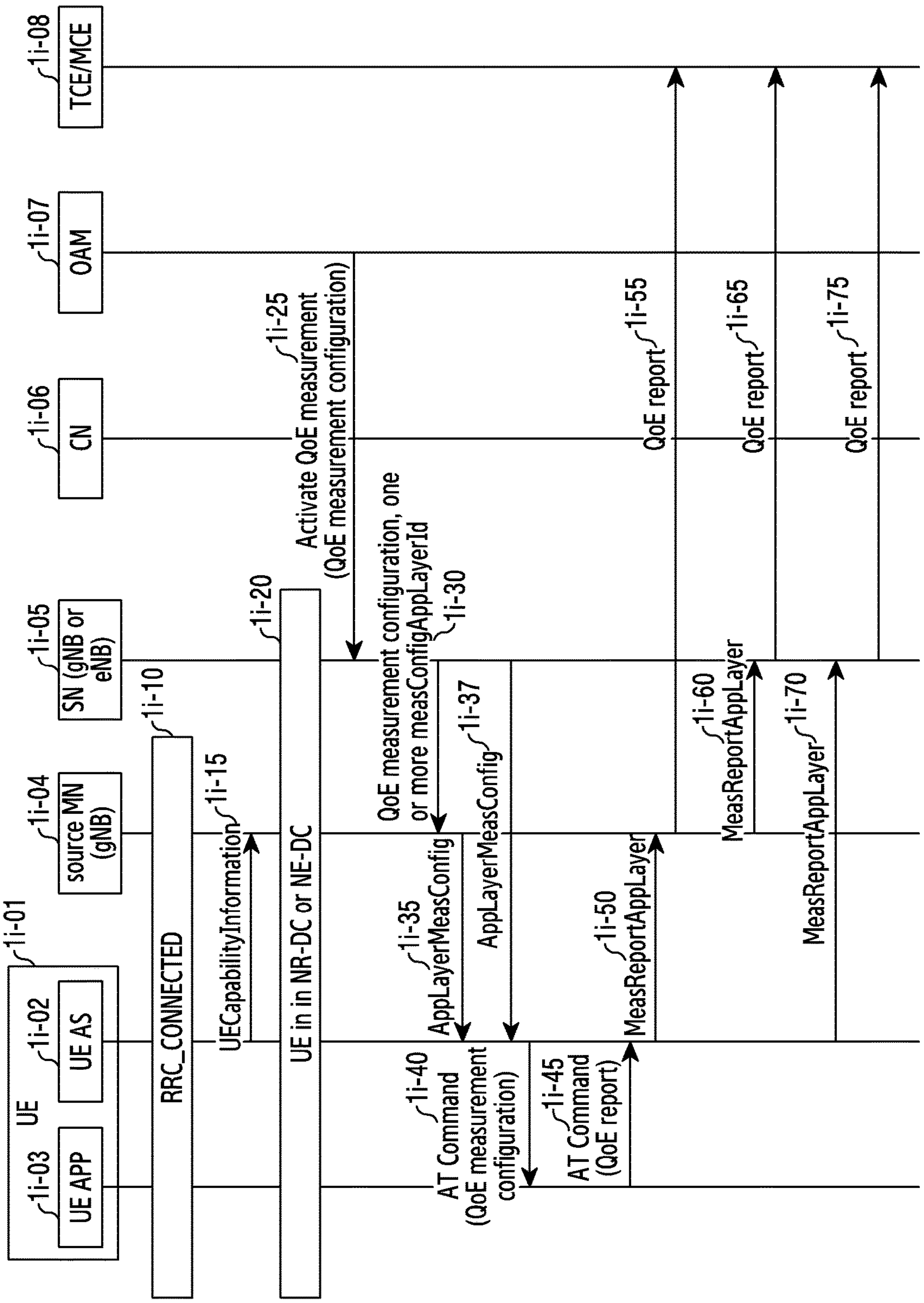
FIG. 1I is a flowchart illustrating a procedure in which a UE configured with NR-DC or NE-DC reports QoE measurement results to a base station based on QoE measurement configurations according to an embodiment of the disclosure.

FIG. 1I is a flowchart illustrating a procedure in which a UE configured with NR-DC or NE-DC reports QoE measurement results to a base station based on QoE measurement configurations according to an embodiment of the disclosure.

Referring to FIG. 1I, a UE 1*i*-01 may be in an RRC connected mode (RRC_CONNECTED) by establishing an RRC connection with a base station 1*i*-04 (e.g., a source master node (MN)), in operation 1*i*-10. In FIG. 1I, both the UE access stratum (UE AS) 1*i*-02 and the UE application (UE APP layer) 1*i*-03 may be collectively referred to as the UE 1*i*-01. In FIG. 1I, the base station 1*i*-04 may be referred to as a source master node (MN).

In operation 1*i*-15, the UE AS 1*i*-02 may transmit a UE capability information message (UECapabilityInformation) to the source MN 1*i*-04. Information included in the UE capability information message may follow the above-described embodiment. Additionally, the UE capability information message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation **1*i*-20, NR-DC (dual connectivity) or NE-DC may be configured for the UE 1*i*-01. The UE 1*i*-01 in the NR-DC or NE-DC may transmit and receive data from the source master node (MN) 1*i*-04 and the SN 1*i*-05**. The flowchart in which the NR-DC or NE-DC is configured to the UE may follow the above-described embodiment.

In operation **1*i*-25, the operations administration and maintenance (OAM) 1*i*-07 may provide QoE measurement configuration information to the SN 1*i*-05** to activate QoE measurement. The QoE measurement configuration information may include at least one of the service type on (serviceType) which QoE measurement is to be performed, the management collection entity (MCE) IP Address, QoE configuration information (measConfigAppLayerContainer), and the QoE reference. For reference, the above-described information may consist of one or more pieces.

In operation **1*i*-30, the SN 1*i*-05 may deliver at least one of the QoE measurement configuration information received from the OAM 1*i*-07 to the source MN 1*i*-04. Additionally, this disclosure proposes that the SN delivers the measConfigAppLayerId mapped to each measReportAppLayerContainer to the MN. This is to prevent the same measConfigAppLayerId from being allocated to the UE AS 1*i*-02 when the MN receives QoE measurement configuration information from the OAM in the future. This is because it cannot be determined which QoE reference or MCE IP address the measConfigAppLayerId is mapped to, so the QoE report may not be properly delivered to the final destination (the trace collection entity (TCE) or the measurement collection entity (MCE)) 1*i*-08 even if the source MN 1*i*-04 or the SN 1*i*-05 receives the QoE report from UE AS 1*i*-02 when the same measConfigAppLayerId is allocated to the UE AS 1*i*-02**. Accordingly, the SN may deliver at least one of serviceType, MCE IP Address, QoE reference, and measConfigAppLayerContainer mapped to each measConfigAppLayerId to the MN along with measConfigAppLayerId. Of course, the UE may report the QoE report to the SN without a separate indicator for the MN or with an explicit information element. Alternatively, the UE may instruct to change the reporting leg from the SN to the MN (or from the MN to the SN) for each measConfigAppLayerId and transmit MeasReportAppLayer to the MN and the SN accordingly. As an example, when a specific measConfigAppLayerId is configured to report to the MN, the UE may transmit the QoE measurement result to the MN, and when another specific MeasConfigAppLayerId is configured to report to the SN, the UE may transmit the corresponding QoE measurement result to the SN. Additionally, the SN may configure the UE to report the entire QoE report (i.e., MeasReportAppLayer) to the MN, so the SN may need to deliver above information (e.g., at least one of the measurement QoE measurement configuration information includes at least one of the service type on which QoE measurement should be performed (serviceType), MCE (Management Collection Entity) IP Address, QoE configuration information (measConfigAppLayerContainer), and QoE reference) to the MN.

In operation **1*i*-35, the source MN 1*i*-04 may store QoE measurement configuration information (AppLayerMeasConfig) in a predetermined RRC message (e.g., RRCReconfiguration or RRCResume) through SRB1 based on information received from the SN, and transmit the same to the UE AS 1*i*-02. The UE AS 1*i*-02** may identify whether the SN has provided QoE measurement configuration information through a predetermined RRC message. The UE may also be configured to report a QoE report (i.e., MeasReportAppLayer) to the MN or SN through the predetermined RRC message. This may follow the above-described embodiment.

Alternatively, without performing operation **1*i*-35, through operation 1*i*-37, the SN 1*i*-05 may store AppLayerMeasConfig in a predetermined RRC message (e.g., RRCReconfiguration) through SRB3, and transmit the directly to the UE AS 1*i*-02**. The UE may also be configured to report a QoE report (i.e., MeasReportAppLayer) to the MN or SN through the predetermined RRC message. This may follow the above-described embodiment.

In operation **1*i*-40, the UE AS 1*i*-02 may deliver all or part of the AppLayerMeasConfig received from the source MN 1*i*-04 or the SN 1*i*-05 through the AT command to the UE APP 1*i*-03**.

In operation **1*i*-45, the UE APP 1*i*-03 may perform QoE measurement according to the configuration information received in operation 1*i*-40 and report the measurement results to the UE AS 1*i*-02** through the AT command according to the configuration information.

In operation **1*i*-50, if the UE AS 1*i*-02 is configured to report the measurement result to the source MN 1*i*-04, the UE AS 1*i*-02 may report the measurement result to the source MN 1*i*-04 through the predetermined RRC message (e.g., MeasReportAppLayer) based on the information received in operation 1*i*-45. The signaling radio bearer (SRB)4** may be used to report the QoE measurement result. The information included in the predetermined RRC message and the procedure for transmitting the same may follow the above-described embodiment.

In operation **1*i*-55, the source MN 1*i*-04 may deliver the measurement result information received in operation 1*i*-50 to the final destination (TCE or MCE) 1*i*-08**.

Alternatively, without performing operation **1*i*-55, the source MN 1*i*-04 may deliver, in operation 1*i*-60, the measurement result information received in operation 1*i*-50 to SN 1*i*-05, and the SN may directly deliver the same, in operation 1*i*-65 to the final destination (the TCE or MCE) 1*i*-08**.

Alternatively, in operation **1*i*-70, If the UE AS 1*i*-02 is configured to report the measurement result to the SN 1*i*-05, the UE AS 1*i*-02 may directly report the measurement result to the SN 1*i*-05 through the predetermined RRC message (e.g., MeasReportAppLayer) based on the information received in operation 1*i*-45. As an example, without performing operation 1*i*-50, the AS UE may directly report the measurement results to the SN 1*i*-05 through operation 1*i*-70 and through a predetermined RRC message (e.g., MeasReportAppLayer) based on the information received in operation 1*i*-45. In this case, at least one of split SRB4, new SRB, split new SRB, SRB2, and SRB3 may be used to report QoE measurement results. The SN may directly deliver, in operation 1*i*-75, the received information to the final destination (the TCE or MCE) 1*i*-08. For reference, when operation 1*i*-7 is performed, operations 1*i*-55, 1*i*-60, and 1*i*-65** may be omitted.

If the UE AS **1*i*-02 is configured to transmit a MeasReportAppLayer message to the source MN 1*i*-04, as in the above-described embodiment, the MN may configure the UE to transmit to SN 1*i*-05** through the predetermined RRC message (RRCReconfiguration or AppLayerMeasConfig). For reference, this may be configured for each MeasConfigAppLayerId.

If the UE AS 1*i*-02 is configured to transmit the MeasReportAppLayer message to the SN 1*i*-05, the SN may configure the UE to transmit to source MN 1*i*-04 through the predetermined RRC message (RRCReconfiguration or AppLayerMeasConfig). As an example, the predetermined RRC message may refer to an RRC connection reconfiguration message or an RRC connection resumption (RRCResume). Specifically, through the RRC message, the SN may instruct the UE to transmit MeasReportAppLayer to the MN through one of the following.

- 1 bit indicator with optional presence: If this indicator is absent, it means UE is requested to report MeasReportAppLayer to MCG or SCG. If this indicator is present, it means UE is requested to report MeasReportAppLayer to SCG or MCG.
- CellGroupId: A value of one of maxSecondayCellGroups ranging from 0 to an integer value. If 0 or the field is absent, the UE transmits MeasReportAppLayer to the MCG. When 1 is indicated, the UE transmits MeasReportAppLayer to the first SCG. When one SCG is configured, the corresponding SCG refers to the first SCG. When multiple SCGs are configured for the UE, an integer value to enable the UE to transmit MeasReportAppLayer to a specific SCG is configured. When configured to CellGruoupId rather than 1 bit indicator, there is an advantage of having forward compatibility because there is no need to introduce additional signaling when two or more SCGs are configured to the UE in the future. As an example, the CellGroupId may be expressed in ASN.1 form of INTEGER (0 . . . maxSecondaryCellGroups).

Of course, by instructing each measConfigAppLayerId to change the reporting leg from the MN to the SN, the UE may transmit MeasReportAppLayer to the MN and the SN accordingly. In other words, when a specific measConfigAppLayerId is configured to report to the MN, the UE may transmit the QoE measurement result to the MN, and when another specific MeasConfigAppLayerId is configured to report to the SN, the UE may transmit the QoE measurement results for this specific MeasConfigAppLayerId to the SN.

In this embodiment, a method of coordination for each node is proposed so that the measConfigAppLayerId allocated to the UE does not have the same value for all nodes (MN and SNs) or all cell groups (i.e., measConfigAppLayerId is unique across the Cell Groups). Additionally, when congestion occurs in the MN or SN, a method is proposed in which the UE configured to report MeasReportAppLayer to the MN may report the MeasReportAppLayer to the SN (a method in which the UE configured to report MeasReportAppLayer to the SN may report the MeasReportAppLayer to the MN), and the signaling procedures and necessary elements of the MN and SN are proposed accordingly.

Figure 1J:
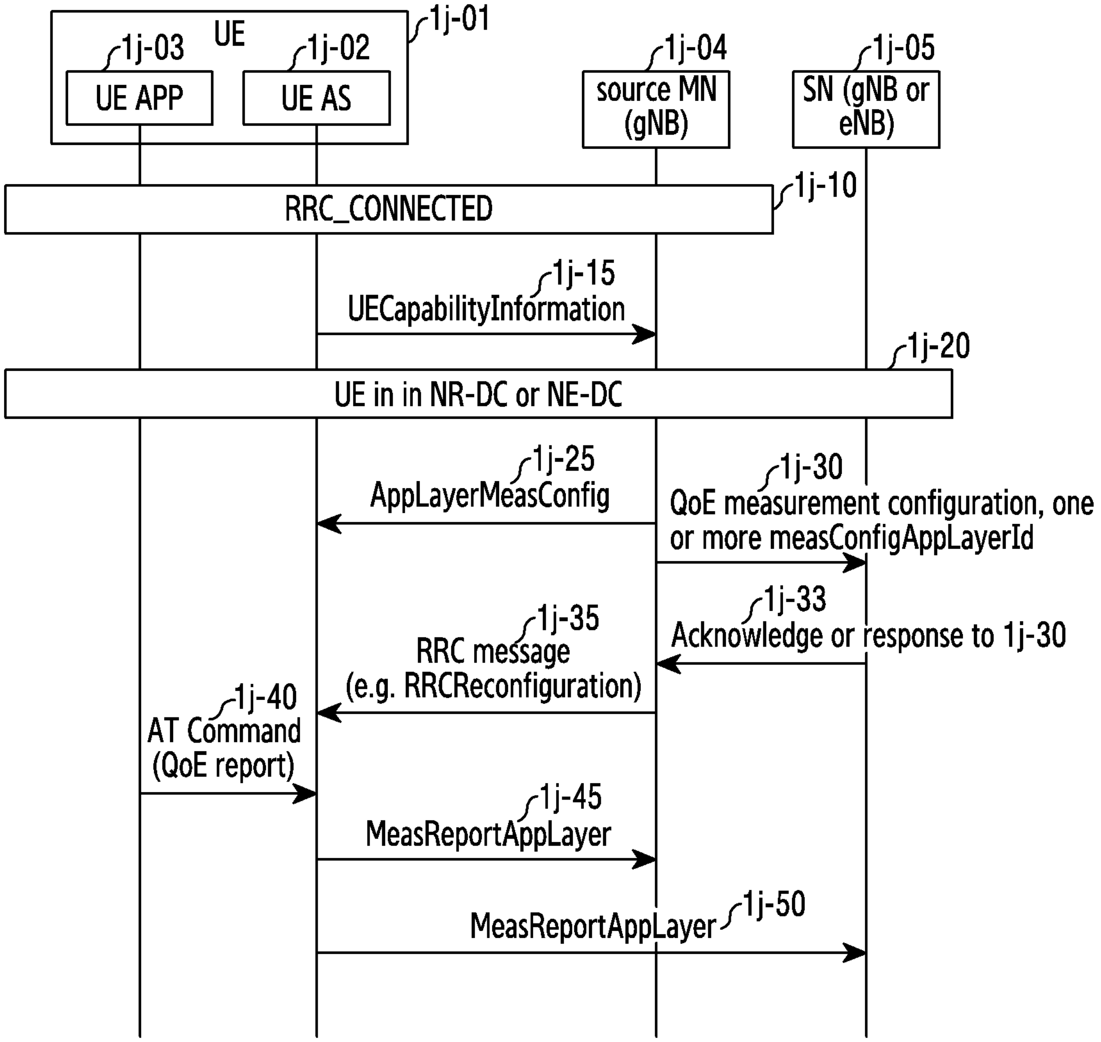
FIG. 1J is a flowchart illustrating a procedure in which a UE configured with NR-DC or NE-DC reports QoE measurement results to a base station based on QoE measurement configurations depending on whether pause Reporting is configured according to an embodiment of the disclosure.

FIG. 1J is a flowchart illustrating a procedure in which a UE configured with NR-DC or NE-DC reports QoE measurement results to a base station based on QoE measurement configurations depending on whether pauseReporting is configured according to an embodiment of the disclosure.

In an embodiment of the disclosure, for convenience of explanation, the detailed description will focus on reporting the QoE measurement results mapped to a specific measConfigAppLayerId or the QoE measurement results for all measConfigAppLayerIds to the master node (MN). If the UE reports the QoE measurement results mapped to a specific measConfigAppLayerId or the QoE measurement results for all measConfigAppLayerIds to the secondary node (SN), because it is only necessary to simply change the MN and SN, the embodiment of the disclosure may be applied as it is. In addition, in an embodiment of the disclosure, for convenience of explanation, signaling procedures between the base station (the MN or SN) and the core network (CN), signaling procedures between the base station (the MN or SN) and the operations administration and maintenance (OAM), and signaling procedures between the base station (the MN or SN) and the trace collection entity/measurement collection entity (TCE/MCE) are omitted, but the above-described embodiment may be followed.

Referring to FIG. 1J, a UE **1*j*-01 may be in an RRC connected mode (RRC_CONNECTED) by establishing an RRC connection with a base station 1*j*-04 (e.g., a source master node (MN)), in operation 1*j*-10. In FIG. 1J, both the UE access stratum (UE AS) 1*j*-02 and the UE application (UE APP layer) 1*j*-03 may be collectively referred to as the UE 1*j*-01. In FIG. 1J, the base station 1*j*-04** may be referred to as the source master node (MN).

In operation **1*j*-15, the UE AS 1*j*-02 may transmit a UE capability information message (UECapabilityInformation) to the source MN 1*j*-04**. Information included in the UE capability information message may follow the above-described embodiment. Additionally, the UE capability information message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation **1*j*-20, NR-DC (dual connectivity) or NE-DC may be configured for the UE 1*j*-01. The UE 1*j*-01 in the NR-DC or NE-DC may transmit and receive data from the source master node (MN) 1*j*-04 and a secondary node (SN) 1*j*-05**. The flowchart in which the NR-DC or NE-DC is configured to the UE may follow the above-described embodiment.

In operation **1*j*-25, the UE AS 1*j*-02 may receive a predetermined RRC message (RRCReconfiguration or RRCResume) including QoE measurement configuration information (AppLayerMeasConfig) from the source MN 1*j*-04**.

In operation **1*j*-30, for the reasons of the above-described embodiment, the source MN 1*j*-04 may transmit, to the SN 1*j*-05, a predetermined message for the SN 1*j*-05 to receive from the UE the QoE measurement results mapped to a specific one or multiple measConfigAppLayerIds configured for the UE 1*j*-01 to distribute congestions or loads. As an example, the source MN 1*j*-04 may transmit one or more measConfigAppLayerId and QoE measurement configuration information mapped thereto to the SN 1*j*-05**, and information requesting the SN to receive the corresponding QoE measurement results may be included in the predetermined message.

In operation **1*j*-33, the SN 1*j*-05 may transmit the predetermined message to the source MN 1*j*-04 in response to operation 1*j*-30. The predetermined message may include information on which QoE measurement result the SN may receive from the UE 1*j*-01** among one or more measConfigAppLayerIds and the QoE measurement configuration information mapped thereto.

In operation **1*j*-35, the source MN 1*j*-04 may transmit the predetermined RRC message (e.g., RRCReconfiguration) to instruct the UE AS 1*j*-02 to transmit the QoE measurement results mapped to a specific one or multiple measConfigAppLayerIds to the SN 1*j*-05. In this case, through the above predetermined RRC message, the source MN 1*j*-04 may configure pauseReporting to true or false for each measConfigAppLayer configuration (of course, possible in operation 1***j*-25). For reference, the UE AS 1*j*-02 may not transmit QoE measurement results to both the MN and SN for measConfigAppLayer with pauseReporting configured to true. In other words, the UE AS 1*j*-02 may transmit the QoE measurement result to the SN 1*j*-05 only for one or more measConfigAppLayers where pauseReporting is configured to false or absent and are configured to transmit the QoE measurement result to the SN. When the SN congestion problem is resolved in the future, the MN may configure pauseReporting for each measConfigAppLayer to false to allow the UE to transmit QoE measurement results to the SN for the corresponding measConfigAppLayer.

In operation 1*j*-40, the UE APP 1*j*-03 may perform QoE measurement according to the configuration information received in operation 1*j*-25 or operation 1*j*-35, and report the measurement results to the UE AS 1*j*-02 through the AT command according to the configuration information.

Based on the information received in operation 1*j*-40 for each measConfigAppLayer, the UE AS 1*j*-02 may transmit to the source MN 1*j*-04 for the QoE measurement result (MeasReportAppLayer) to be transmitted to the MN, in operation 1*j*-45, and transmit to the SN 1*j*-05 for the QoE measurement result (MeasReportAppLayer) to be transmitted to the SN, in operation 1*j*-50.

Figure 1K:
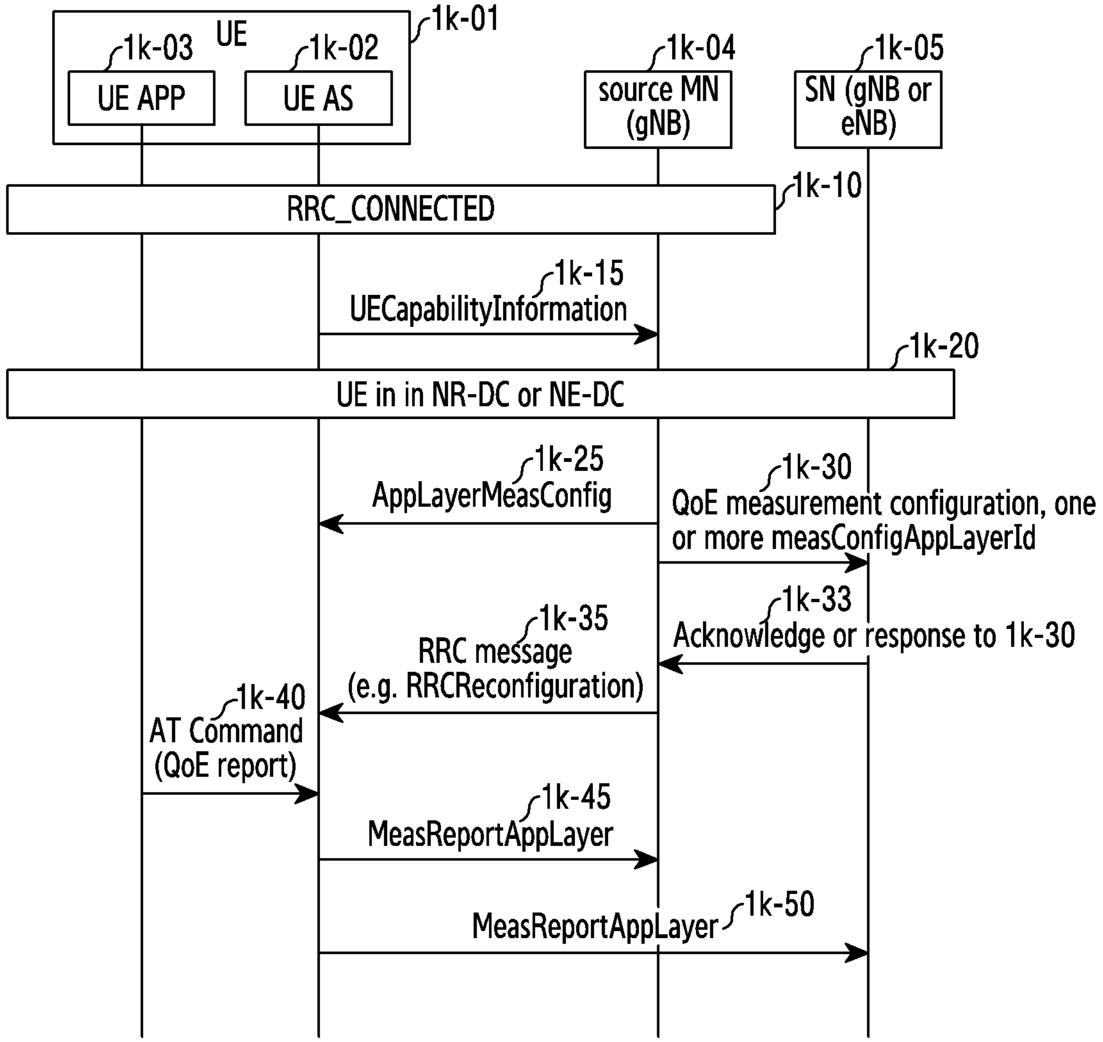
FIG. 1K is a flowchart illustrating a procedure in which a UE configured with NR-DC or NE-DC reports QoE measurement results to a base station based on QoE measurement configurations depending on whether pause Reporting is configured according to an embodiment of the disclosure.

FIG. 1K is a flowchart illustrating a procedure in which a UE configured with NR-DC or NE-DC reports QoE measurement results to a base station based on QoE measurement configurations depending on whether pauseReporting is configured according to an embodiment of the disclosure.

In an embodiment of the disclosure, for convenience of explanation, the detailed description will focus on reporting the QoE measurement results mapped to a specific measConfigAppLayerId or the QoE measurement results for all measConfigAppLayerIds to the master node (MN). If the UE reports the QoE measurement results mapped to a specific measConfigAppLayerId or the QoE measurement results for all measConfigAppLayerIds to the secondary node (SN), because it is only necessary to simply change the MN and SN, the embodiment of the disclosure may be applied as it is. In addition, in an embodiment of the disclosure, for convenience of explanation, signaling procedures between the base station (the MN or SN) and the core network (CN), signaling procedures between the base station (the MN or SN) and the operations administration and maintenance (OAM), and signaling procedures between the base station (the MN or SN) and the trace collection entity/measurement collection entity (TCE/MCE) are omitted, but the above-described embodiment may be followed.

Referring to FIG. 1K, a UE 1*k*-01 may be in an RRC connected mode (RRC_CONNECTED) by establishing an RRC connection with a base station 1*k*-04 (e.g., a source master node (MN)), in operation 1*k*-10. In FIG. 1K, both the UE access stratum (UE AS) 1*k*-02 and the UE application (UE APP layer) 1*k*-03 may be collectively referred to as the UE 1*k*-01. In FIG. 1K, the base station 1*k*-04 may be referred to as the source master node (MN).

In operation 1*k*-15, the UE AS 1*k*-02 may transmit a UE capability information message (UECapabilityInformation) to the source MN 1*k*-04. Information included in the UE capability information message may follow the above-described embodiment. Additionally, the UE capability information message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation 1*k*-20, NR-DC (dual connectivity) or NE-DC may be configured for the UE 1*k*-01. The UE 1*k*-01 in the NR-DC or NE-DC may transmit and receive data from the source master node (MN) 1*k*-04 and a secondary node (SN) 1*k*-05. The flowchart in which the NR-DC or NE-DC is configured to the UE 1*k*-01 may follow the above-described embodiment.

In operation 1*k*-25, the UE AS 1*k*-02 may receive a predetermined RRC message (RRCReconfiguration or RRCResume) including QoE measurement configuration information (AppLayerMeasConfig) from the source MN 1*k*-04.

In operation 1*k*-30, for the reasons of the above-described embodiment, the source MN 1*k*-04 may transmit, to the SN 1*k*-05, a predetermined message for the SN 1*k*-05 to receive from the UE the QoE measurement results mapped to a specific one or multiple measConfigAppLayerIds configured for the UE 1*k*-01 to distribute congestions or loads. As an example, the source MN 1*k*-04 may transmit one or more measConfigAppLayerId and QoE measurement configuration information mapped thereto to the SN 1*k*-05, and information requesting the SN to receive the corresponding QoE measurement results may be included in the predetermined message.

In operation 1*k*-33, the SN 1*k*-05 may transmit the predetermined message to the source MN 1*k*-04 in response to operation 1*k*-30. The predetermined message may include information on which QoE measurement result the SN may receive from the UE 1*k*-01 among one or more measConfigAppLayerIds and the QoE measurement configuration information mapped thereto.

In operation 1*k*-35, the source MN 1*k*-04 may transmit the predetermined RRC message (e.g., RRCReconfiguration) to instruct the UE AS 1*k*-02 to transmit the QoE measurement results mapped to a specific one or multiple measConfigApLayerIds to the SN 1*k*-05. In this case, through the above predetermined RRC message, the source MN 1*k*-04 may configure pauseReporting to true or false for each measConfigAppLayer configuration (of course, possible in operation 1*k*-25). For reference, the UE AS 1*k*-02 may not transmit QoE measurement results to both the MN and SN for measConfigAppLayer with pauseReporting configured to true. However, if QoE measurement results need to be transmitted to the SN for measConfigAppLayer with pauseReporting configured to true, the SN may configure the pauseReporting separately. That is, if the pauseReporting is configured to true for the SN for the measConfigAppLayer, the UE AS 1*k*-02 may not transmit the QoE measurement results for the measConfigAppLayer to the SN, otherwise (if the pauseReporting is configured to false or is absent), the UE AS 1*k*-02 may transmit the QoE measurement results for the corresponding measConfigAppLayer to the SN. For reference, the SN may configure the pauseReporting for each measConfigAppLayer by transmitting a separate RRC message to the UE AS 1*k*-02 or configure the pauseReporting for each measConfigAppLayer by requesting to transmit the corresponding message to the MN. There is an advantage in that the pauseReporting function for each meanConfigAppLayer may be applied for each node.

In operation 1*k*-40, the UE APP 1*k*-03 may perform QoE measurement according to the configuration information received in operation 1*k*-25 or operation 1*k*-35, and report the measurement results to the UE AS 1*k*-02 through the AT command according to the configuration information.

Based on the information received in operation 1*k*-40 for each measConfigAppLayer, the UE AS 1*k*-02 may transmit to the source MN 1*k*-04 for the QoE measurement result (MeasReportAppLayer) to be transmitted to the MN, in operation 1*k*-45, and transmit to the SN 1*k*-05 for the QoE measurement result (MeasReportAppLayer) to be transmitted to the SN, in operation 1*k*-50.

Figure 1L:
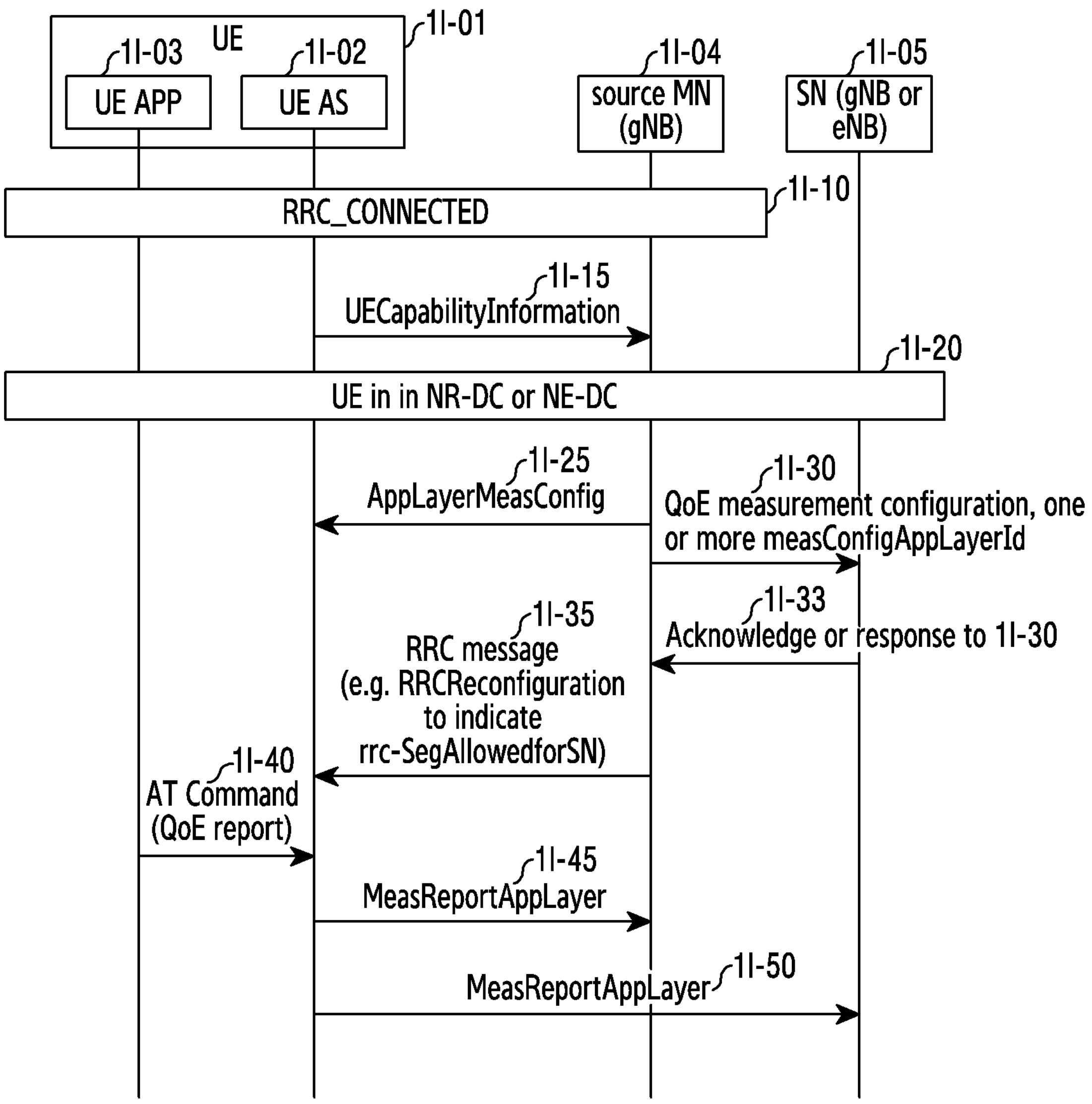
FIG. 1L is a flowchart illustrating a procedure in which a UE configured with NR-DC or NE-DC reports QoE measurement results to a base station based on QoE measurement configurations depending on whether RRC message splitting is configured according to an embodiment of the disclosure.

FIG. 1L is a flowchart illustrating a procedure in which a UE configured with NR-DC or NE-DC reports QoE measurement results to a base station based on QoE measurement configurations depending on whether RRC message splitting is configured according to an embodiment of the disclosure.

In an embodiment of the disclosure, for convenience of explanation, the detailed description will focus on reporting the QoE measurement results mapped to a specific measConfigAppLayerId or the QoE measurement results for all measConfigAppLayerIds to the master node (MN). If the UE reports the QoE measurement results mapped to a specific measConfigAppLayerId or the QoE measurement results for all measConfigAppLayerIds to the secondary node (SN), because it is only necessary to simply change the MN and SN, the embodiment of the disclosure may be applied as it is. In addition, in an embodiment of the disclosure, for convenience of explanation, signaling procedures between the base station (the MN or SN) and the core network (CN), signaling procedures between the base station (the MN or SN) and the operations administration and maintenance (OAM), and signaling procedures between the base station (the MN or SN) and the trace collection entity/measurement collection entity (TCE/MCE) are omitted, but the above-described embodiment may be followed.

Referring to FIG. 1L, a UE 1*l*-01 may be in an RRC connected mode (RRC_CONNECTED) by establishing an RRC connection with a base station 1*l*-04 (e.g., a source master node (MN)), in operation 1*l*-10. In FIG. 1L, both the UE access stratum (UE AS) 1*l*-02 and the UE application (UE APP layer) 1*l*-03 may be collectively referred to as the UE 1*l*-01. In FIG. 1L, the base station 1*l*-04 may be referred to as the source master node (MN).

In operation 1*l*-15, the UE AS 1*l*-02 may transmit a UE capability information message (UECapabilityInformation) to the source MN 1*l*-04. Information included in the UE capability information message may follow the above-described embodiment. Additionally, the UE capability information message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation 1*l*-20, NR-DC (dual connectivity) or NE-DC may be configured for the UE 1*l*-01. The UE in the NR-DC or NE-DC may transmit and receive data from the source master node (MN) 1*l*-04 and a secondary node (SN) 1*l*-05. The flowchart in which the NR-DC or NE-DC is configured to the UE may follow the above-described embodiment.

In operation 1*l*-25, the UE AS 1*l*-02 may receive a predetermined RRC message (RRCReconfiguration or RRCResume) including QoE measurement configuration information (AppLayerMeasConfig) from the source MN 1*l*-04.

In operation 1*l*-30, for the reasons of the above-described embodiment, the source MN 1*l*-04 may transmit, to the SN 1*l*-05, a predetermined message for the SN 1*l*-05 to receive from the UE the QoE measurement results mapped to a specific one or multiple measConfigAppLayerIds configured for the UE 1*l*-01 to distribute congestions or loads. As an example, the source MN 1*l*-04 may transmit one or more measConfigAppLayerId and QoE measurement configuration information mapped thereto to the SN 1*l*-05, and information requesting the SN to receive the corresponding QoE measurement results may be included in the predetermined message.

In operation 1*l*-33, the SN 1*l*-05 may transmit the predetermined message to the source MN 1*l*-04 in response to operation 1*l*-30. The predetermined message may include information on which QoE measurement result the SN may receive from the UE 1*l*-01 among one or more measConfigAppLayerIds and the QoE measurement configuration information mapped thereto.

In operation 1*l*-35, the source MN 1*l*-04 may transmit the predetermined RRC message (e.g., RRCReconfiguration) to instruct the UE AS 1*l*-02 to transmit the QoE measurement results mapped to a specific one or multiple measConfigAppLayerIds to the SN 1*l*-05. In this case, through the above predetermined RRC message, the source MN 1*l*-04 may inform whether the UE AS 1*l*-02 may transmit the QoE measurement result (MeasurementReportAppLayer) (for example, rrc-SegAllowedforSN) to the SN 1*l*-05 through RRC message segmentation. Accordingly, the UE AS 1*l*-02 may transmit the QoE measurement result to the SN 1*l*-05 through the following procedure.

1> if the encoded RRC message is larger than the maximum supported size of one PDCP SDU specified in TS 38.323 [5]:

2> if the RRC message segmentation is enabled based on the field rrc-SegAllowed received in appLayerMeasConfig:

3> initiate the UL message segment transfer procedure as specified in clause 5.7.7;

2> else:

3> discard the RRC message;

1> else:

2> submit the MeasurementReportAppLayer message to lower layers for transmission upon which the procedure ends.

Of course, a message generated by the SN directly may be stored in the predetermined RRC message, so that the SN may configure whether to divide the RRC message, and the MN may deliver the same to the UE AS. The source MN 1*l*-04 according to an embodiment of the disclosure directly configures whether the UE AS may report the QoE measurement result to the UE AS 1*l*-02 through the RRC message division to the SN 1*l*-05, so the SN 1*l*-05 has the advantage of not having to inform the UE AS 1*l*-02 of whether the RRC message is divided by separately transmitting the RRC message to the UE AS 1*l*-02. Alternatively, the source MN 1*l*-04 according to an embodiment of the disclosure receives the information on whether to divide the RRC message directly configured by the SN from the SN and delivers the same to the UE AS, so the SN 1*l*-05 has the advantage of not having to inform the UE AS 1*l*-02 of whether the RRC message is divided by separately transmitting the RRC message to the UE AS 1*l*-02.

In operation 1*l*-40, the UE APP 1*l*-03 may perform QoE measurement according to the configuration information received in operation 1*l*-25 or operation 1*l*-35, and report the measurement results to the UE AS 1*l*-02 through the AT command according to the configuration information.

Based on the information received in operation 1*l*-40 for each measConfigAppLayer, the UE AS 1*l*-02 may transmit to the source MN 1*l*-04 for the QoE measurement result (MeasReportAppLayer) to be transmitted to the MN, in operation 1*l*-45, and transmit to the SN 1*l*-05 for the QoE measurement result (MeasReportAppLayer) to be transmitted to the SN, in operation 1*l*-50. In this case, the UE may transmit the QoE measurement result in consideration of whether the RRC message is divided for each node.

Figure 1M:
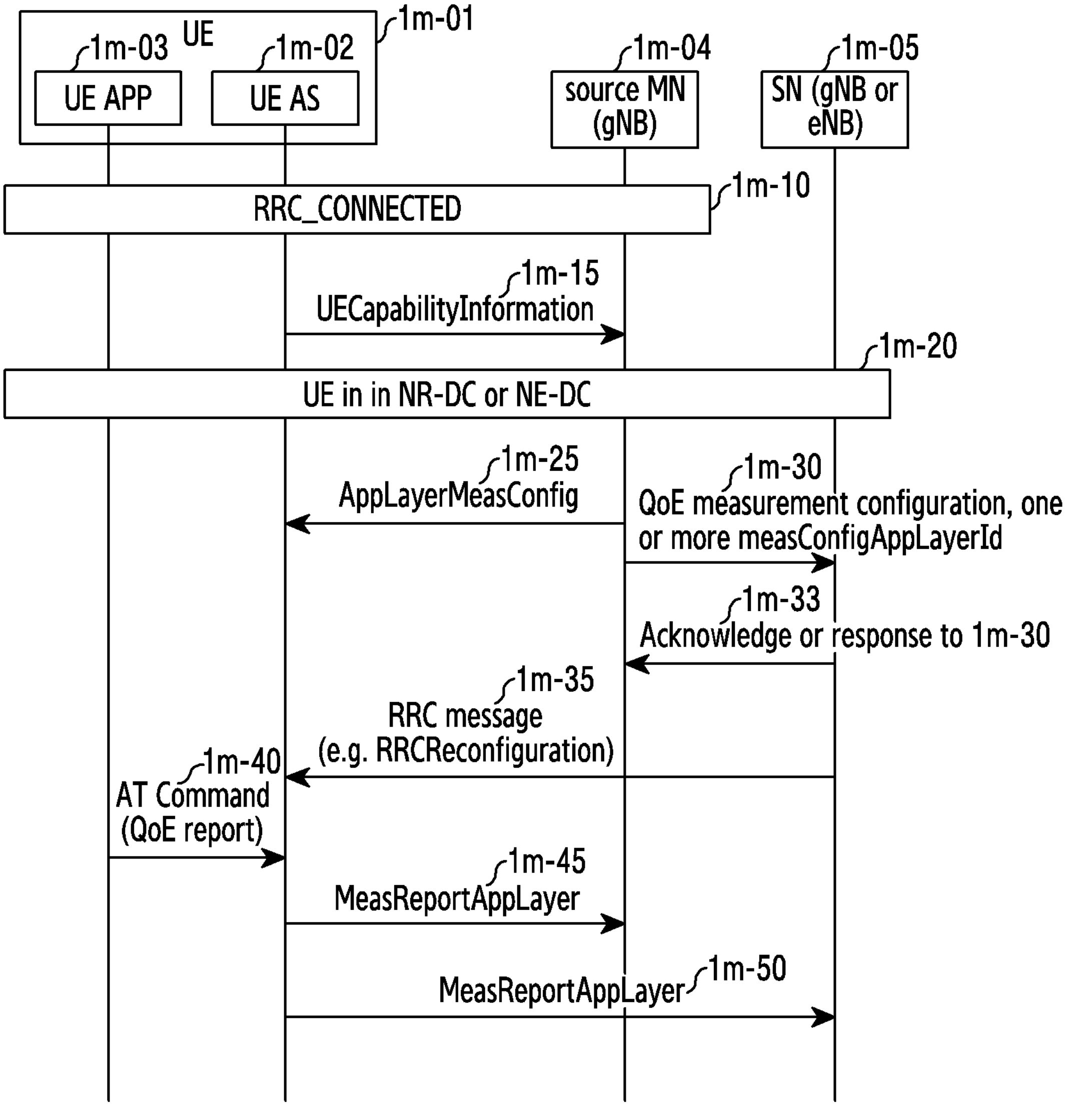
FIG. 1M is a flowchart illustrating a procedure in which a UE configured with NR-DC or NE-DC reports QoE measurement results to a base station based on QoE measurement configurations depending on whether RRC message splitting is configured according to an embodiment of the disclosure.

FIG. 1M is a flowchart illustrating a procedure in which a UE configured with NR-DC or NE-DC reports QoE measurement results to a base station based on QoE measurement configurations depending on whether RRC message splitting is configured according to an embodiment of the disclosure.

In an embodiment of the disclosure, for convenience of explanation, the detailed description will focus on reporting the QoE measurement results mapped to a specific measConfigAppLayerId or the QoE measurement results for all measConfigAppLayerIds to the master node (MN). If the UE reports the QoE measurement results mapped to a specific measConfigAppLayerId or the QoE measurement results for all measConfigAppLayerIds to the secondary node (SN), because it is only necessary to simply change the MN and SN, the embodiment of the disclosure may be applied as it is. In addition, in an embodiment of the disclosure, for convenience of explanation, signaling procedures between the base station (the MN or SN) and the core network (CN), signaling procedures between the base station (the MN or SN) and the operations administration and maintenance (OAM), and signaling procedures between the base station (the MN or SN) and the trace collection entity/measurement collection entity (TCE/MCE) are omitted, but the above-described embodiment may be followed.

Referring to FIG. 1M, a UE 1*m*-01 may be in an RRC connected mode (RRC_CONNECTED) by establishing an RRC connection with a base station 1*m*-04 (e.g., a source master node (MN)), in operation 1*m*-10. In FIG. 1M, both the UE access stratum (UE AS) 1*m*-02 and the UE application (UE APP layer) 1*m*-03 may be collectively referred to as the UE 1*m*-01. In FIG. 1M, the base station 1*m*-04 may be referred to as the source master node (MN).

In operation 1*m*-15, the UE AS 1*m*-02 may transmit a UE capability information message (UECapabilityInformation) to the source MN 1*m*-04. Information included in the UE capability information message may follow the above-described embodiment. Additionally, the UE capability information message may include information indicating whether ne-dc or nr-dc is supported. Additionally, the UE capability information message may include information that allows the ne-dc or the nr-dc to receive QoE configuration information from the MN and/or the SN, not limited to the master node (MN), and to report QoE results to the MN and/or the SN.

In operation 1*m*-20, NR-DC (dual connectivity) or NE-DC may be configured for the UE 1*m*-01. The UE 1*m*-01 in the NR-DC or NE-DC may transmit and receive data from the source master node (MN) 1*m*-04 and a secondary node (SN) 1*m*-05. The flowchart in which the NR-DC or NE-DC is configured to the UE 1*m*-01 may follow the above-described embodiment.

In operation 1*m*-25, the UE AS 1*m*-02 may receive a predetermined RRC message (RRCReconfiguration or RRCResume) including QoE measurement configuration information (AppLayerMeasConfig) from the source MN 1*m*-04.

In operation 1*m*-30, for the reasons of the above-described embodiment, the source MN 1*m*-04 may transmit, to the SN 1*m*-05, a predetermined message for the SN 1*m*-05 to receive from the UE the QoE measurement results mapped to a specific one or multiple measConfigAppLayerIds configured for the UE 1*m*-01 to distribute congestions or loads. As an example, the source MN 1*m*-04 may transmit one or more measConfigAppLayerId and QoE measurement configuration information mapped thereto to the SN 1*m*-05, and information requesting the SN to receive the corresponding QoE measurement results may be included in the predetermined message.

In operation 1*m*-33, the SN 1*m*-05 may transmit the predetermined message to the source MN 1*m*-04 in response to operation 1*m*-30. The predetermined message may include information on which QoE measurement result the SN may receive from the UE 1*m*-0*l* among one or more measConfigAppLayerIds and the QoE measurement configuration information mapped thereto.

In operation 1*m*-35, the SN 1*m*-05 may transmit the predetermined RRC message (e.g., RRCReconfiguration) to instruct the UE AS 1*m*-02 to transmit the QoE measurement results mapped to a specific one or multiple measConfigAppLayerIds to the SN 1*m*-05. Additionally, through the above message, the SN 1*m*-05 may inform whether the UE AS 1*m*-02 may transmit the QoE measurement result (MeasurementReportAppLayer) (for example, rrc-SegAllowedforSN) to the SN 1*m*-05 through RRC message segmentation. Accordingly, the UE AS 1*m*-02 may transmit the QoE measurement result to the SN 1*m*-05 through the following procedure.

1> if the encoded RRC message is larger than the maximum supported size of one PDCP SDU specified in TS 38.323 [5]:
  2> if the RRC message segmentation is enabled based on the field rrc-SegAllowed received in appLayerMeasConfig:
    3> initiate the UL message segment transfer procedure as specified in clause 5.7.7;
  2> else:
    3> discard the RRC message;
1> else:
  2> submit the MeasurementReportAppLayer message to lower layers for transmission upon which the procedure ends.

The SN 1*m*-05 according to an embodiment of the disclosure may directly deliver to the UE AS 1*m*-02 whether the RRC message is divided and/or which QoE measurement result mapped to the MeasConfigAppLayer(s) should be transmitted to the SN, there is an advantage in that the source MN 1*m*-04 does not have to separately transmit the RRC message to the UE AS 1*m*-02. For reference, when the SN 1*m*-05 provides the message in operation 1*m*-35 to the UE AS 1*m*-02, only a part of the QoE measurement configuration information may be received and transmitted to the UE AS. For example, the MN may provide the UE AS with only an Id or Index indicating which MeasConfigAppLayer among measConfigAppLayerToAddModList may be transmitted to the SN.

In operation 1*m*-40, the UE APP 1*m*-03 may perform QoE measurement according to the configuration information received in operation 1*m*-25 or operation 1*m*-35, and report the measurement results to the UE AS 1*m*-02 through the AT command according to the configuration information.

Based on the information received in operation 1*m*-40 for each measConfigAppLayer, the UE AS 1*m*-02 may transmit to the source MN 1*m*-04 for the QoE measurement result (MeasReportAppLayer) to be transmitted to the MN, in operation 1*m*-45, and transmit to the SN 1*m*-05 for the QoE measurement result (MeasReportAppLayer) to be transmitted to the SN, in operation 1*m*-50. In this case, the UE may transmit the QoE measurement result in consideration of whether the RRC message is divided for each node.

Figure 1N:
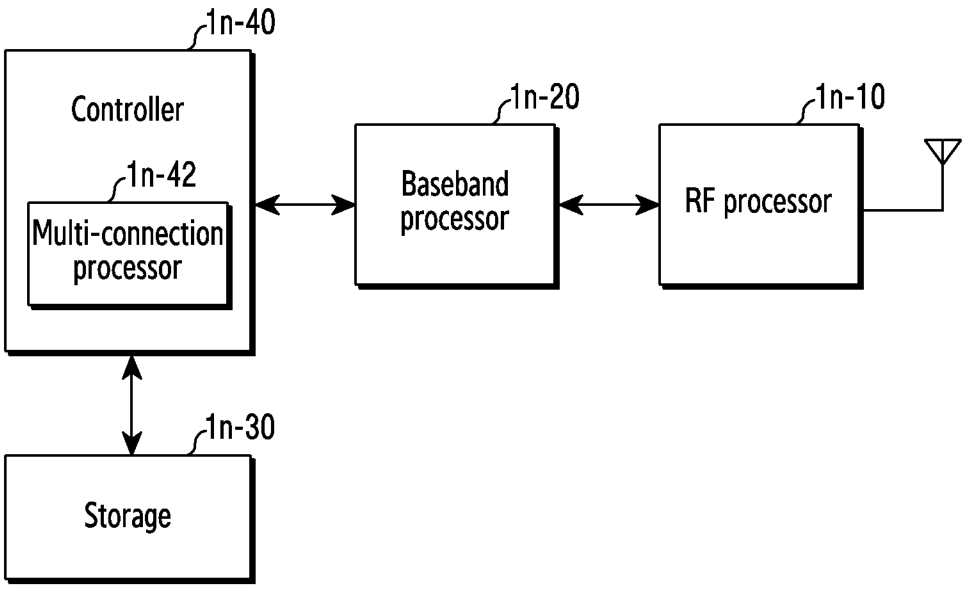
FIG. 1N is a block diagram illustrating a configuration of a UE according to an embodiment of the disclosure.
Figure 10:
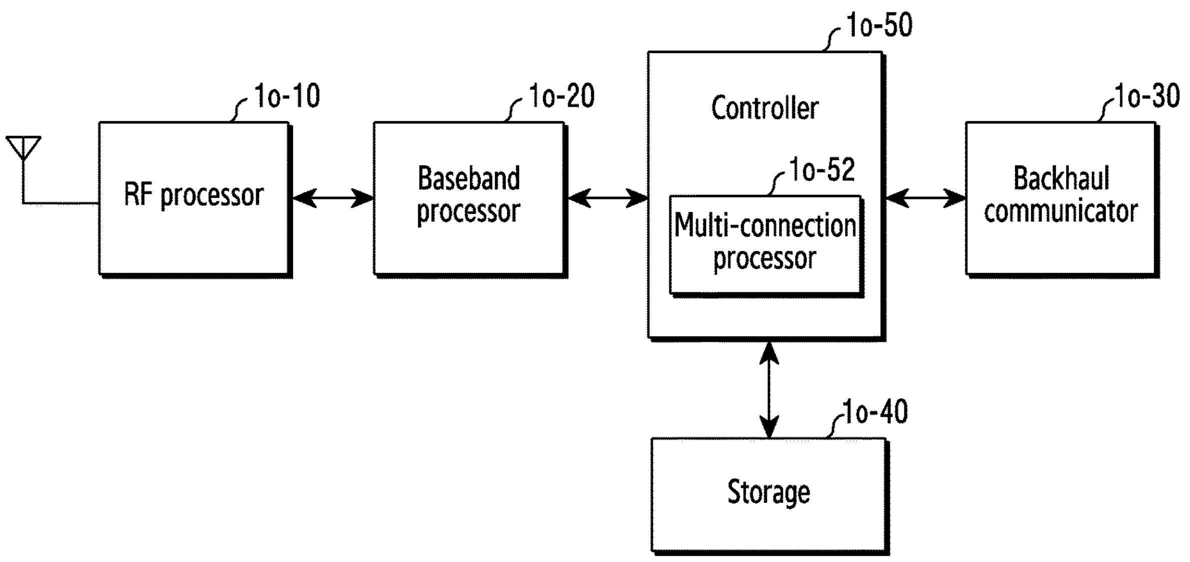

FIG. 1N is a block diagram illustrating the configuration of a UE according to an embodiment of the disclosure.

Referring to FIG. 1N, the UE may include a radio frequency (RF) processor 1*n*-10, a baseband processor 1*n*-20, a storage 1*n*-30, and a controller 1*n*-40. Of course, it is not limited to the above example, and the UE may include fewer or more configurations than the configuration illustrated in FIG. 1N.

The RF processor 1*n*-10 may perform a function for transmitting and receiving a signal through a radio channel, such as band conversion and amplification of a signal. That is, the RF processor 1*n*-10 may up-convert a baseband signal provided from the baseband processor 1*n*-20 into an RF band signal, transmits the RF band signal through an antenna, and down-converts the RF band signal received through the antenna to the baseband signal. For example, the RF processor 1*n*-10 may include a transmission filter, a reception filter, an amplifier, a mixer, an oscillator, a digital to analog converter (DAC), an analog to digital converter (ADC), etc. In FIG. 1N, only one antenna is illustrated, but the UE may include a plurality of antennas. In addition, the RF processor 1*n*-10 may include a plurality of RF chains. Furthermore, the RF processor 1*n*-10 may perform beamforming. For the beamforming, the RF processor 1*n*-10 may adjust the phase and magnitude of each of signals transmitted and received through a plurality of antennas or antenna elements. In addition, the RF processor 1*n*-10 may perform MIMO, and may receive multiple layers when performing the MIMO operation.

The baseband processor 1*n*-20 performs a function of converting between a baseband signal and a bit stream according to a physical layer standard of the system. For example, when transmitting data, the baseband processor 1*n*-20 may generate complex symbols by encoding and modulating a transmitted bit stream. In addition, when receiving data, the baseband processor 1*n*-20 may restore a received bit stream by demodulating and decoding the baseband signal provided from the RF processor 1*n*-10. For example, in the case of following an orthogonal frequency division multiplexing (OFDM) scheme, when transmitting data, the baseband processor 1*n*-20 may generate complex symbols by encoding and modulating a transmitted bit stream, map the complex symbols to subcarriers, and then configure OFDM symbols through an inverse fast Fourier transform (IFFT) operation and cyclic prefix (CP) insertion. In addition, when receiving data, the baseband processor 1*n*-20 may divide the baseband signal provided from the RF processor 1*n*-10 into OFDM symbol units, restore signals mapped to subcarriers through a fast Fourier transform (FFT) operation, and then restore a received bit stream through demodulation and decoding.

The baseband processor 1*n*-20 and the RF processor 1*n*-10 transmits and receives signals as described above. Accordingly, the baseband processor 1*n*-20 and the RF processor 1*n*-10 may be referred to as a transmitter, a receiver, a transceiver, or a communicator. Furthermore, at least one of the baseband processor 1*n*-20 and the RF processor 1*n*-10 may include a plurality of communication modules to support a plurality of different radio access technologies. In addition, at least one of the baseband processor 1*n*-20 and the RF processor 1*n*-10 may include different communication modules to process signals of different frequency bands. For example, the different radio access technologies may include a wireless LAN (e.g., IEEE 802.11), a cellular network (e.g., LTE), or the like. In addition, the different frequency bands may include a super high frequency (SHF) (e.g., 2 . . . NRHz, NRhz) band and a millimeter wave (e.g., 60 GHz) band. The UE may transmit and receive signals with the base station by using the baseband processor 1*n*-20 and the RF processor 1*n*-10, and the signals may include control information and data.

The storage 1*n*-30 may store data such as a basic program, an application program, and configuration information for the operation of the UE. In particular, the storage 1*n*-30 may store information related to a second access node performing wireless communication by using the second radio access technology. In addition, the storage 1*n*-30 provides stored data according to the request of the controller 1*n*-40. The storage 1*n*-30 may be composed of a storage medium such as ROM, RAM, hard disk, CD-ROM, and DVD, or a combination of storage media. In addition, the storage 1*n*-30 may be composed of a plurality of memories. According to an embodiment, the storage 1*n*-30 may store a program for performing the above-described QoE configuring and reporting method.

The controller 1*n*-40 may control overall operations of the UE. For example, the controller 1*n*-40 transmits and receives signals through the baseband processor 1*n*-20 and the RF processor 1*n*-10. In addition, the controller 1*n*-40 writes data in the storage 1*n*-30 and reads the data. To this end, the controller 1*n*-40 may include at least one processor. For example, the controller 1*n*-40 may include a communication processor (CP) that controls for communication and an application processor (AP) that controls an upper layer such as an application program. In addition, at least one component within the UE may be implemented with one chip. In addition, according to an embodiment of the disclosure, the controller 1*n*-40 may include a multi-connection processor 1*n*-42 that performs processing for operating in a multi-connection mode.

According to an embodiment of the disclosure, the controller 1*n*-40 may control each configuration of the UE to perform the method for performing the above-described QoE configuring and reporting method.

FIG. 1O is a block diagram illustrating the configuration of an NR base station according to an embodiment of the disclosure.

Referring to FIG. 1O, the base station may include an RF processor 1*o*-10, a baseband processor 1*o*-20, a backhaul communicator 1*o*-30, a storage 1*o*-40, and a controller 1*o*-50. Of course, it is not limited to the above example, and the base station may include fewer or more configurations than the configuration illustrated in FIG. 1O.

The RF processor 1*o*-10 may perform a function for transmitting and receiving a signal through a radio channel, such as band conversion and amplification of the signal. That is, the RF processor 1*o*-10 may up-convert the baseband signal provided from the baseband processor 1*o*-20 into an RF band signal, transmit the same through an antenna, and down-convert the RF band signal received through the antenna into a baseband signal. For example, the RF processor 1*o*-10 may include a transmission filter, a reception filter, an amplifier, a mixer, an oscillator, a DAC, an ADC, and the like. Although only one antenna is illustrated in the diagram, the first access node may include a plurality of antennas. In addition, the RF processor 1*o*-10 may include a plurality of RF chains. Furthermore, the RF processor 1*o*-10 may perform beamforming. For the beamforming, the RF processor 1*o*-10 may adjust the phase and magnitude of each of signals transmitted and received through a plurality of antennas or antenna elements. The RF processor may perform a downlink MIMO operation by transmitting one or more layers.

The baseband processor 1o-20 performs a function of converting between a baseband signal and a bit stream according to the physical layer standard of the first radio access technology. For example, when transmitting data, the baseband processor 1o-20 generates complex symbols by encoding and modulating a transmitted bit stream. In addition, when receiving data, the baseband processor 1o-20 may restore a received bit stream through demodulating and decoding the baseband signal provided from the RF processor 1o-10. For example, in the case of following the OFDM scheme, when transmitting data, the baseband processor 1o-20 may generate complex symbols by encoding and modulating a transmitted bit stream, map the complex symbols to subcarriers, and then configure OFDM symbols through IFFT operation and CP insertion. In addition, when receiving data, the baseband processor 1o-20 may divide the baseband signal provided from the RF processor 1o-10 into OFDM symbol units, restore signals mapped to subcarriers through FFT operation, and then restore a received bit stream through demodulation and decoding. The baseband processor 1o-20 and the RF processor 1o-10 may transmit and receive signals as described above. Accordingly, the baseband processor 1o-20 and the RF processor 1o-10 may be referred to as a transmitter, a receiver, a transceiver, a communicator, or a wireless communicator. The base station may transmit and receive signals with the UE by using the baseband processor 1o-20 and the RF processor 1o-10, and the signals may include control information and data.

The backhaul communicator 1o-30 provides an interface for performing communication with other nodes in the network. That is, the backhaul communicator 1o-30 may convert a bit stream transmitted from the main base station to another node, for example, an auxiliary base station, a core network, or the like, into a physical signal, and convert a physical signal received from the other node into a bit stream.

The storage 1o-40 stores data such as a basic program, an application program, and configuration information for the operation of the main base station. In particular, the storage 1o-40 may store information on a bearer allocated to an accessed UE, a measurement result reported from the accessed UE, and the like. In addition, the storage 1o-40 may store information serving as a criterion for determining whether to provide or stop multiple connections to the UE. In addition, the storage 1o-40 may provide stored data according to the request of the controller 1o-50. The storage 1o-40 provides stored data according to the request of the controller 1o-50. The storage 1o-40 may be composed of a storage medium such as ROM, RAM, hard disk, CD-ROM, and DVD, or a combination of storage media. In addition, the storage 1o-40 may be composed of a plurality of memories. According to an embodiment, the storage 1o-40 may store a program for performing the above-described QoE configuring and reporting method.

The controller 1o-50 controls overall operations of the main base station. For example, the controller 1o-50 transmits and receives signals through the baseband processor 1o-20 and the RF processor 1o-10 or through the backhaul communicator 1o-30. In addition, the controller 1o-50 writes data in the storage 1o-40 and reads the data. To this end, the controller 1o-50 may include a multi-connection processor 1o-52. In addition, at least one component of the base station may be implemented with one chip. In addition, each component of the base station may operate to perform the embodiments of the disclosure described above.

Methods according to embodiments described in the claims or disclosure of the disclosure may be implemented in the form of hardware, software, or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

When implemented as software, a computer-readable storage medium that stores one or more programs (software modules) may be provided. One or more programs stored in a computer-readable storage medium are configured to be executable by one or more processors in an electronic device (configured for execution). One or more programs include instructions that cause the electronic device to execute methods according to embodiments described in the claims or disclosure of the disclosure.

These programs (software modules, software) include random access memory, non-volatile memory including flash memory, read only memory (ROM), and electrically erasable programmable ROM (Electrically Erasable Programmable Read Only Memory (EEPROM), magnetic disc storage device, Compact Disc-ROM (CD-ROM: Compact Disc-ROM), Digital Versatile Discs (DVDs), or other types of It can be stored in an optical storage device or magnetic cassette. Alternatively, it may be stored in a memory consisting of a combination of some or all of these. Additionally, multiple configuration memories may be included.

In addition, the program may be operated through a communication network such as the Internet, an intranet, a local area network (LAN), a wide LAN (WLAN), or a storage area network (SAN), or a combination thereof. It may be stored on an attachable storage device that is accessible. This storage device can be connected to a device performing an embodiment of the disclosure through an external port. Additionally, a separate storage device on a communication network may be connected to the device performing an embodiment of the disclosure.

In the specific embodiments of the disclosure described above, components included in the disclosure are expressed in singular or plural numbers depending on the specific embodiment presented. However, singular or plural expressions are selected to suit the presented situation for convenience of explanation, and the disclosure is not limited to singular or plural components, and even components expressed in plural may be composed of singular or singular. Even expressed components may be composed of plural elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a secondary node (SN) in a wireless communication system, the method comprising:

transmitting, to a master node (MN), first configuration information associated with a quality of experience (QoE) measurement, wherein the first configuration information includes an indicator indicating whether a segmentation of a report of the QoE measurement via a first signaling radio bearer (SRB) associated with the report of the QoE measurement to the SN is allowed; and receiving, directly from a user equipment (UE) via the first SRB, the report of the QoE measurement based on the indicator, wherein the first configuration information is included in second configuration information transmitted to the UE via second SRB.

2. The method of claim 1, wherein the second SRB is configured between a master node (MN) and the UE.

3. The method of claim 2, wherein the second SRB is SRB 1.

4. The method of claim 2, wherein the first configuration information further includes at least one first QoE configuration associated with at least one different QoE measurement, respectively, and wherein an identifier for identifying the at least one first QoE configuration is different from an identifier for identifying at least one second QoE configuration included in second configuration information associated with a QoE measurement associated with the MN.

5. The method of claim 4, wherein each of the at least one first QoE configuration includes SRB information indicating which SRB in which a report of a QoE measurement associated with each of the at least one first QoE configuration is transmitted.

6. A method performed by a user equipment (UE) in a wireless communication system, the method comprising:

receiving, from a master node (MN) via a second signaling radio bearer (SRB), second configuration information associated with a quality of experience (QoE) measurement, the second configuration comprises first configuration information including an indicator indicating whether a segmentation of a report of the QoE measurement via a first SRB associated with the report of the QoE measurement to a secondary node (SN) is allowed;

identifying the first SRB for transmitting the report of the QoE measurement to the SN among at least one SRB; and transmitting, directly to the SN on the identified first SRB, the report of the QoE measurement based on the indicator, wherein the first configuration information is transmitted from the SN to the MN.

7. The method of claim 6, wherein the second SRB is configured between a master node (MN) and the UE.

8. The method of claim 7, wherein the second SRB is SRB 1.

9. The method of claim 7, wherein the first configuration information further includes at least one first QoE configuration associated with at least one different QoE measurement, respectively, and wherein an identifier for identifying the at least one first QoE configuration is different from an identifier for identifying at least one second QoE configuration included in second configuration information associated with a QoE measurement associated with the MN.

10. The method of claim 6, further comprising:

identifying whether the report of the QoE measurement exceeds a maximum support size of a data unit associated with the report of the QoE measurement;

in case that the QoE measurement is identified as exceeding the maximum support size of the data unit, identifying whether the segmentation is allowed based on the indicator; and in case that the segmentation is identified as being allowed, transmitting, to the SN, the report of the QoE measurement to which the segmentation is applied.

11. A secondary node (SN) in a wireless communication system, the SN comprising:

a transceiver;

memory, comprising one or more storage media, storing instructions, and one or more processors communicatively coupled to the transceiver and the memory, wherein the instructions, when executed by the one or more processors individually or collectively, cause the SN to:

transmit, to a master node (MN), first configuration information associated with a quality of experience (QoE) measurement, wherein the first configuration information includes an indicator indicating whether a segmentation of a report of the QoE measurement via first signaling radio bearer (SRB) associated with the report of the QoE measurement to the SN is allowed, and receive, directly from a user equipment via the first SRB, the report of the QoE measurement based on the indicator, and wherein the first configuration information is included in second configuration information transmitted to the UE via second SRB.

12. The SN of claim 11, wherein the second SRB is configured between a master node (MN) and the UE.

13. The SN of claim 12, wherein the second SRB is SRB 1.

14. The SN of claim 12, wherein the first configuration information further includes at least one first QoE configuration associated with at least one different QoE measurement, respectively, and wherein an identifier for identifying the at least one first QoE configuration is different from an identifier for identifying at least one second QoE configuration included in second configuration information associated with a QoE measurement associated with the MN.

15. The SN of claim 14, wherein each of the at least one first QoE configuration includes SRB information indicating which SRB in which a report of a QoE measurement associated with each of the at least one first QoE configuration is transmitted.

16. A user equipment (UE) in a wireless communication system, the UE comprising:

a transceiver;

memory, comprising one or more storage media, storing instructions; and one or more processors communicatively coupled to the transceiver and the memory, wherein the instructions, when executed by the one or more processors individually or collectively, cause the UE to:

receive, from a master node (MN) via a second signaling radio bearer (SRB), second configuration information associated with a quality of experience (QoE) measurement, the second configuration information including first configuration information including an indicator indicating whether a segmentation of a report of the QoE measurement via a first signaling radio bearer (SRB) associated with the report of the QoE measurement to a secondary node (SN) is allowed, identify the first SRB for transmitting the report of the QoE measurement to the SN among at least one SRB, and transmit, directly to the SN on the identified first SRB, the report of the QoE measurement based on the indicator, wherein the first configuration information is transmitted from the SN to the MN.

17. The UE of claim 16, wherein the second SRB is configured between a master node (MN) and the UE.

18. The UE of claim 16, wherein the instructions, when executed by the processor individually or collectively, further cause the UE to:

identify whether the report of the QoE measurement exceeds a maximum support size of a data unit associated with the report of the QoE measurement, in case that the QoE measurement is identified as exceeding the maximum support size of the data unit, identify whether the segmentation is allowed based on the indicator, and in case that the segmentation is identified as being allowed, transmit, to the SN, the report of the QoE measurement to which the segmentation is applied.

* * * * *